(12) United States Patent
Konno et al.

(10) Patent No.: US 11,444,325 B2
(45) Date of Patent: *Sep. 13, 2022

(54) ELECTROLYTIC SOLUTION AND ELECTROCHEMICAL DEVICE

(71) Applicant: Showa Denko Materials Co., Ltd., Tokyo (JP)

(72) Inventors: Kaoru Konno, Tokyo (JP); Kumpei Yamada, Tokyo (JP); Ryuichiro Fukuta, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/615,640

(22) PCT Filed: May 31, 2018

(86) PCT No.: PCT/JP2018/021036
§ 371 (c)(1),
(2) Date: Nov. 21, 2019

(87) PCT Pub. No.: WO2018/221676
PCT Pub. Date: Dec. 6, 2018

(65) Prior Publication Data
US 2020/0168952 A1    May 28, 2020

(30) Foreign Application Priority Data

Jun. 1, 2017 (WO) .................. PCT/JP2017/020484
Feb. 26, 2018 (JP) .............................. JP2018-032310

(51) Int. Cl.
| H01M 10/0567 | (2010.01) |
| H01G 11/64 | (2013.01) |
| H01M 4/38 | (2006.01) |
| H01M 4/583 | (2010.01) |
| H01M 10/0525 | (2010.01) |

(52) U.S. Cl.
CPC ........ *H01M 10/0567* (2013.01); *H01G 11/64* (2013.01); *H01M 4/382* (2013.01); *H01M 4/386* (2013.01); *H01M 4/387* (2013.01); *H01M 4/5835* (2013.01); *H01M 10/0525* (2013.01)

(58) Field of Classification Search
None
See application file for complete search history.

(56) References Cited

U.S. PATENT DOCUMENTS

| 3,053,874 A | 9/1962 | Pepe |
| 8,076,032 B1 | 12/2011 | West et al. |
| 9,437,371 B2 | 9/2016 | Pena Hueso et al. |
| 9,466,857 B1 * | 10/2016 | Cheng ............... H01M 10/0567 |
| 10,155,778 B2 | 12/2018 | Syvret et al. |
| 10,273,253 B1 | 4/2019 | Zhou et al. |
| 10,355,313 B2 | 7/2019 | Pe a Hueso et al. |
| 10,590,149 B2 | 3/2020 | Syvret et al. |
| 2013/0183576 A1 | 7/2013 | Suguro et al. |
| 2013/0236777 A1 | 9/2013 | Taki et al. |
| 2014/0356735 A1 | 12/2014 | Pena Hueso et al. |
| 2016/0190644 A1 | 6/2016 | Takase et al. |
| 2016/0308249 A1 | 10/2016 | Johnson et al. |
| 2017/0301953 A1 * | 10/2017 | Pena Hueso ...... H01M 10/0569 |
| 2018/0034106 A1 * | 2/2018 | Schmidt ........... H01M 10/0568 |
| 2018/0261879 A1 | 9/2018 | Johnson et al. |
| 2019/0348713 A1 | 11/2019 | Yu et al. |

FOREIGN PATENT DOCUMENTS

| CN | 102372732 A | 3/2012 |
| CN | 102723528 A | 10/2012 |
| CN | 103401019 A | 11/2013 |
| CN | 105037928 | * 11/2015 |
| CN | 105742702 A | 7/2016 |
| CN | 106025358 A | 10/2016 |
| CN | 106795184 A | 5/2017 |
| EP | 3 038 194 A1 | 6/2016 |
| JP | H03-236168 A | 10/1991 |
| JP | 2001-185212 A | 7/2001 |
| JP | 2015-005329 A | 1/2015 |
| JP | 2016-126855 A | 7/2016 |
| KR | 10-2013-0137941 A | 12/2013 |
| WO | WO-2012/029653 A1 | 3/2012 |
| WO | WO-2014/059709 A1 | 4/2014 |
| WO | WO-2016/006488 A1 | 1/2016 |
| WO | WO-2016/054621 A1 | 4/2016 |
| WO | WO 2016/146925 | * 9/2016 |

* cited by examiner

*Primary Examiner* — Laura Weiner
(74) *Attorney, Agent, or Firm* — Faegre Drinker Biddle & Reath LLP

(57) ABSTRACT

One aspect of the present invention provides an electrolytic solution comprising a compound represented by the following formula (1), wherein a content of the compound is 10% by mass or less based on the total amount of the electrolytic solution,

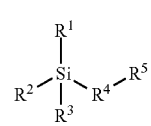

(1)

wherein $R^1$ to $R^3$ each independently represent an alkyl group or a fluorine atom, $R^4$ represents an alkylene group, and $R^5$ represents an organic group containing a nitrogen atom.

6 Claims, 15 Drawing Sheets

ELECTROLYTIC SOLUTION AND ELECTROCHEMICAL DEVICE

TECHNICAL FIELD

The present invention relates to an electrolytic solution and an electrochemical device.

BACKGROUND ART

In recent years, high-performance electrochemical devices are needed such as non-aqueous electrolytic solution secondary batteries, representative examples including lithium ion secondary batteries, and capacitors, due to the widespread use of portable electronic devices and electric vehicles. As means for improving the performance of an electrochemical device, for example, a method of adding a predetermined additive to an electrolytic solution has been studied. In Patent Literature 1, there is disclosed an electrolytic solution for a non-aqueous electrolytic solution battery which contains a specific siloxane compound in order to improve cycle characteristics and internal resistance characteristics.

CITATION LIST

Patent Literature

Patent Literature 1: Japanese Unexamined Patent Publication No. 2015-005329

SUMMARY OF INVENTION

Technical Problem

As is described in Patent Literature 1, it is important to reduce a resistance of the electrochemical device. Then, an object of this invention is to provide an electrolytic solution that can reduce the resistance of the electrochemical device. In addition, another object of the present invention is to provide an electrochemical device having a reduced resistance.

Solution to Problem

The present inventors have found that the resistance of the electrochemical device can be reduced by the specific compound containing silicon atoms and nitrogen atoms being contained in the electrolytic solution.

In addition, as one of the other characteristics which are required for electrochemical devices, low-temperature input characteristics are included. The charging capacity of the electrochemical device decreases at low temperature (for example, 0° C. or lower) than the charging capacity at normal temperature (for example, 25° C.), but it is also required for the electrochemical devices to suppress the decrease of the charging capacity as much as possible, in other words, to be excellent in the low-temperature input characteristics. The present inventors have also found that the low-temperature input characteristics of the electrochemical device can be improved by the specific compound containing silicon atoms and nitrogen atoms being contained in the electrolytic solution.

In addition, as is described in Patent Literature 1, it is also important to improve cycle characteristics of the electrochemical device. In addition, it is also important to improve discharge rate characteristics of the electrochemical device. Furthermore, it is also required that the volume increase (expansion) of the electrochemical device with time is suppressed. It has also been found by the present inventors that these characteristics of the electrochemical device can be improved by the compound being contained in the electrolytic solution.

The present invention provides, as a first aspect, an electrolytic solution comprising a compound represented by the following formula (1), wherein a content of the compound is 10% by mass or less based on the total amount of the electrolytic solution,

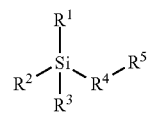

(1)

wherein $R^1$ to $R^3$ each independently represent an alkyl group or a fluorine atom, $R^4$ represents an alkylene group, and $R^5$ represents an organic group containing a nitrogen atom.

$R^5$ is preferably a group represented by the following formula (2):

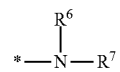

(2)

wherein $R^6$ and $R^7$ each independently represent a hydrogen atom or an alkyl group, and * represents a bond.

At least one of $R^1$ to $R^3$ is preferably a fluorine atom.

The present invention provides, as a second aspect, an electrochemical device comprising a positive electrode, a negative electrode and the above electrolytic solution.

The negative electrode preferably comprises a carbon material. The carbon material preferably comprises graphite. The negative electrode preferably further comprises a material comprising at least one element of the group consisting of silicon and tin.

The electrochemical device is preferably a non-aqueous electrolytic solution secondary battery or a capacitor.

Advantageous Effects of Invention

According to the present invention, an electrolytic solution that can reduce a resistance of an electrochemical device can be provided. In addition, according to the present invention, an electrochemical device having a reduced resistance can be provided. In addition, according to one aspect of the present invention, it is also possible to provide an electrolytic solution that can improve low-temperature input characteristics and/or cycle characteristics of an electrochemical device, and an electrochemical device that is excellent in the low-temperature input characteristics and/or the cycle characteristics.

DESCRIPTION OF EMBODIMENTS

Figure 1:
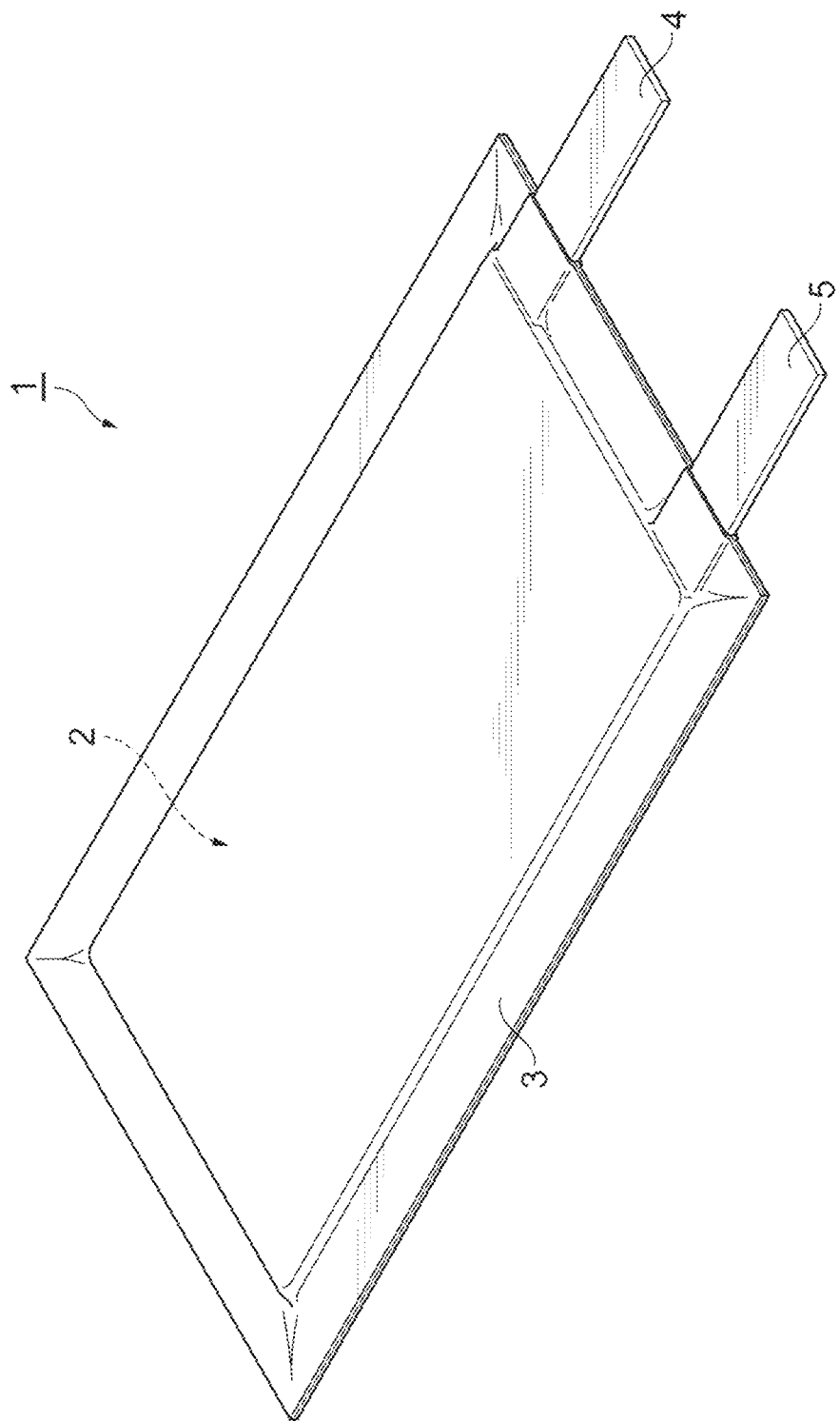
FIG. 1 shows a perspective view showing a non-aqueous electrolytic solution secondary battery which is an electrochemical device according to one embodiment.

Embodiments of the present invention will be described below, appropriately referring to the drawings. However, the present invention is not limited to the following embodiments.

FIG. 1 shows a perspective view showing an electrochemical device according to one embodiment. In the present embodiment, the electrochemical device is a non-aqueous electrolytic solution secondary battery. As shown in FIG. 1, the non-aqueous electrolytic solution secondary battery 1 comprises: an electrode group 2 including a positive electrode, a negative electrode and a separator; and a bag-shaped battery outer package 3 which accommodates the electrode group 2. A positive electrode current collector tab 4 and a negative electrode current collector tab 5 are provided on the positive electrode and the negative electrode, respectively. The positive electrode current collector tab 4 and the negative electrode current collector tab 5 protrude from the inside of the battery outer package 3 to the outside so that the positive electrode and the negative electrode can be electrically connected to the outside of the non-aqueous electrolytic solution secondary battery 1, respectively. The battery outer package 3 is filled with an electrolytic solution (not illustrated). The non-aqueous electrolytic solution secondary battery 1 may be a battery having another shape (coin type, cylindrical type, layered type and the like) than that of the so-called "laminate type" as described above.

The battery outer package 3 may be a container which is formed of, for example, a laminate film. The laminate film may be, for example, a laminated film in which a resin film such as a polyethylene terephthalate (PET) film, a foil of metal such as aluminum, copper and stainless steel, and a sealant layer made from polypropylene or the like are laminated in this order.

Figure 2:
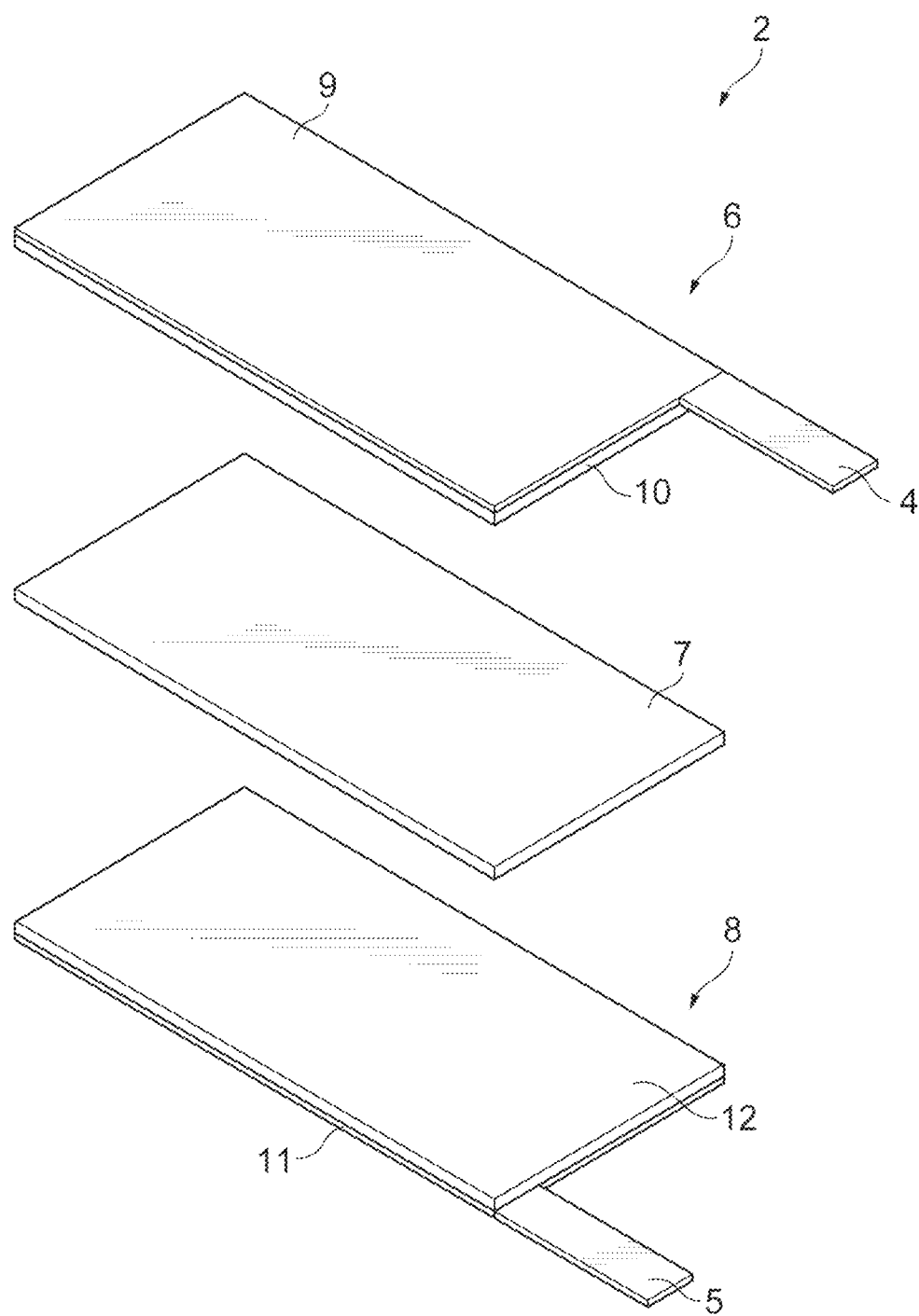
FIG. 2 shows an exploded perspective view showing an electrode group of the secondary battery shown in FIG. 1.

FIG. 2 shows an exploded perspective view showing one embodiment of the electrode group 2 in the non-aqueous electrolytic solution secondary battery 1 shown in FIG. 1. As shown in FIG. 2, the electrode group 2 has a positive electrode 6, a separator 7 and a negative electrode 8, in this order. The positive electrode 6 and the negative electrode 8 are arranged so that a positive electrode mixture layer 10 side and a negative electrode mixture layer 12 side face the separator 7, respectively.

The positive electrode 6 has a positive electrode current collector 9, and a positive electrode mixture layer 10 provided on the positive electrode current collector 9. The positive electrode current collector 9 is provided with the positive electrode current collector tab 4.

The positive electrode current collector 9 is formed from, for example, aluminum, titanium, stainless steel, nickel, baked carbon, an electroconductive polymer, or electroconductive glass. The positive electrode current collector 9 may have a surface of aluminum, copper or the like which has been treated with carbon, nickel, titanium, silver or the like, for the purpose of improving adhesiveness, electroconductivity and oxidation resistance. The thickness of the positive electrode current collector 9 is, for example, 1 to 50 μm from the viewpoint of electrode strength and energy density.

In one embodiment, the positive electrode mixture layer 10 contains a positive electrode active material, an electroconductive agent, and a binder. The thickness of the positive electrode mixture layer 10 is, for example, 20 to 200 μm.

The positive electrode active material may be, for example, lithium oxide. Examples of the lithium oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$ and $Li_xMn_{2-y}M_yO_4$ (wherein in each formula, M represents at least one element selected from the group consisting of Na, Mg, Sc, Y, Mn, Fe, Co, Cu, Zn, Al, Cr, Pb, Sb, V and B (provided that M is an element different from the other elements in each formula); and x=0 to 1.2, y=0 to 0.9, and z=2.0 to 2.3). The lithium oxide represented by $Li_xNi_{1-y}M_yO_z$ may be $Li_xNi_{1-(y1+y2)}Co_{y1}Mn_{y2}O_z$ (provided that x and z are the same as those described above, and y1=0 to 0.9, y2=0 to 0.9, and y1+y2=0 to 0.9), and may be, for example, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$ and $LiNi_{0.8}Co_{0.1}Mn_{0.1}O_2$. The lithium oxide represented by $Li_xNi_{1-y}M_yO_z$ may be $Li_xNi_{1-(y3+y4)}Co_{y3}Al_{y4}O_z$ (provided that x and z are the same as those described above, and y3=0 to 0.9, y4=0 to 0.9, and y3+y4=0 to 0.9), and may be, for example, $LiNi_{0.8}Co_{0.15}Al_{0.05}O_2$.

The positive electrode active material may be, for example, lithium phosphate. Examples of the lithium phosphate include lithium manganese phosphate ($LiMnPO_4$), lithium iron phosphate ($LiFePO_4$), lithium cobalt phosphate ($LiCoPO_4$), and lithium vanadium phosphate ($Li_3V_2(PO_4)_3$).

The content of the positive electrode active material may be 80% by mass or more, or 85% by mass or more based on the total amount of the positive electrode mixture layer, and 99% by mass or less.

The electroconductive agent may be carbon black such as acetylene black or ketjen black, a carbon material such as graphite or graphene, a carbon nanotube, or the like. The content of the electroconductive agent may be, for example, 0.01% by mass or more, 0.1% by mass or more, or 1% by mass or more based on the total amount of the positive electrode mixture layer, and may be 50% by mass or less, 30% by mass, or 15% by mass or less.

Examples of the binder include: resins such as polyethylene, polypropylene, polyethylene terephthalate, polymethyl methacrylate, polyimide, aromatic polyamide, cellulose and nitrocellulose; rubbers such as SBR (styrene-butadiene rubber), NBR (acrylonitrile-butadiene rubber), fluorine rubber, isoprene rubber, butadiene rubber and ethylene-propylene rubber; thermoplastic elastomers such as styrene/butadiene/styrene block copolymers or hydrogenated products thereof, EPDM (ethylene/propylene/diene terpolymer), styrene/ethylene/butadiene/ethylene copolymers, and styrene/isoprene/styrene block copolymers or hydrogenated products thereof; soft resins such as syndiotactic-1,2-polybutadiene, polyvinyl acetate, ethylene/vinyl acetate copolymers, and propylene α-olefin copolymers; fluorine-containing resins such as polyvinylidene fluoride (PVDF), polytetrafluoroethylene, fluorinated polyvinylidene fluoride, polytetrafluoroethylene/ethylene copolymers, polytetrafluoroethylene/vinylidene fluoride copolymers; resins having a nitrile group-containing monomer as a monomer unit; and polymer compositions having an ion conductivity of an alkali metal ion (for example, lithium ion).

The content of the binder may be, for example, 0.1% by mass or more, 1% by mass or more, or 1.5% by mass or more based on the total amount of the positive electrode mixture layer, and may be 30% by mass or less, 20% by mass or less, or 10% by mass or less.

The separator 7 is not limited in particular as long as the separator electronically insulates between the positive electrode 6 and the negative electrode 8, and on the other hand, allows ions to pass therethrough, and has resistances to an oxidizing property in the positive electrode 6 side and to a reducing property in the negative electrode 8 side. Examples of the material (quality of material) of the separator 7 include resins and inorganic substances.

The resins include olefin-based polymers, fluorine-based polymers, cellulose-based polymers, polyimide and nylon. The separator 7 is preferably a porous sheet or a nonwoven fabric which is formed from a polyolefin such as polyethylene and polypropylene, from the viewpoint of being stable with respect to the electrolytic solution and excellent in liquid retentivity.

The inorganic substances include: oxides such as alumina and silicon dioxide; nitrides such as aluminum nitride and silicon nitride; and sulfates such as barium sulfate and calcium sulfate. The separator 7 may be, for example, a separator in which a fibrous or particulate inorganic substance is bonded to a thin film substrate such as a nonwoven fabric, a woven fabric and a microporous film.

The negative electrode 8 has a negative electrode current collector 11, and a negative electrode mixture layer 12 provided on the negative electrode current collector 11. The negative electrode current collector 11 is provided with a negative electrode current collector tab 5.

The negative electrode current collector 11 is formed from copper, stainless steel, nickel, aluminum, titanium, baked carbon, an electroconductive polymer, electroconductive glass, an aluminum-cadmium alloy, or the like. The negative electrode current collector 11 may be one in which the surface of copper, aluminum or the like is treated with carbon, nickel, titanium, silver or the like, for the purpose of improving adhesiveness, electroconductivity, and resistance to reduction. The thickness of the negative electrode current collector 11 is, for example, 1 to 50 µm, from the viewpoint of the electrode strength and the energy density.

The negative electrode mixture layer 12 contains, for example, a negative electrode active material and a binder.

The negative electrode active material is not limited in particular as long as the active material is a material which can occlude and release lithium ions. Examples of the negative electrode active material include: carbon materials; metal composite oxides; oxides or nitrides of Group 4 elements such as tin, germanium and silicon; a simple substance of lithium; lithium alloys such as lithium aluminum alloys; and metals which can form an alloy with lithium, such as Sn and Si. The negative electrode active material is preferably at least one selected from the group consisting of the carbon material and the metal composite oxide, from the viewpoint of safety. The negative electrode active material may be one type alone or a mixture of two or more of the materials. The shape of the negative electrode active material may be, for example, a particulate shape.

The carbon materials include: amorphous carbon materials; natural graphite; composite carbon materials in which a film of amorphous carbon material is formed on natural graphite; and artificial graphite (one that is obtained by baking raw materials of resins such as epoxy resin and phenol resin, or pitch-based raw materials which are obtained from petroleum, coal and the like). The metal composite oxide preferably contains one or both of titanium and lithium, and more preferably contains lithium, from the viewpoint of charge/discharge characteristics at high current density.

Among the negative electrode active materials, the carbon materials have high electroconductivity, and are particularly excellent in low temperature characteristics and cycle stability. Among the carbon materials, the graphite is preferable from the viewpoint of increasing the capacity. In graphite, the interlayer spacing (d002) between carbon network planes in the X-ray wide angle diffraction method is preferably smaller than 0.34 nm, and is more preferably 0.3354 nm or larger and 0.337 nm or smaller. A carbon material which satisfies such conditions is referred to as pseudo-anisotropic carbon, in some cases.

The negative electrode active material may further include a material containing at least one element selected from the group consisting of silicon and tin. The material containing at least one element selected from the group consisting of silicon and tin may be a compound containing at least one element selected from the group consisting of a simple substance of silicon or tin, silicon and tin. The compound may be an alloy containing at least one element selected from the group consisting of silicon and tin, and is, for example, an alloy containing at least one selected from the group consisting of nickel, copper, iron, cobalt, manganese, zinc, indium, silver, titanium, germanium, bismuth, antimony and chromium, in addition to silicon and tin. The compound containing at least one element selected from the group consisting of silicon and tin may be an oxide, a nitride or a carbide, and specifically may be, for example, a silicon oxide such as SiO, $SiO_2$ and LiSiO, a silicon nitride such as $Si_3N_4$ and $Si_2N_2O$, a silicon carbide such as SiC, and a tin oxide such as SnO, $SnO_2$ and LiSnO.

The negative electrode 8 preferably contains a carbon material as a negative electrode active material, more preferably contains graphite, and further preferably contains a mixture of a carbon material and a material containing at least one element selected from the group consisting of silicon and tin, and particularly preferably contains a mixture of graphite and silicon oxide, from the viewpoint of further improving the low-temperature input characteristics of the electrochemical device. The content of the carbon material (graphite) in the mixture relative to the material containing at least one element selected from the group consisting of silicon and tin (silicon oxide) may be 1% by mass or more, or 3% by mass or more, and may be 30% by mass or less, based on the total amount of the mixture.

The content of the negative electrode active material may be 80% by mass or more or 85% by mass or more, and may be 99% by mass or less, based on the total amount of the negative electrode mixture layer.

The binder and its content may be the same as the binder and its content in the positive electrode mixture layer described above.

The negative electrode mixture layer 12 may contain a thickening agent in order to adjust the viscosity. The thickening agent is not limited in particular, and may be carboxymethyl cellulose, methyl cellulose, hydroxymethyl cellulose, ethyl cellulose, polyvinyl alcohol, oxidized starch, phosphorylated starch, casein, and salts thereof, and the like. The thickening agent may be one type alone or a mixture of two or more of the materials.

In the case where the negative electrode mixture layer 12 contains the thickening agent, the content is not limited in particular. The content of the thickening agent may be 0.1% by mass or more, is preferably 0.2% by mass or more, and is more preferably 0.5% by mass or more, based on the total amount of the negative electrode mixture layer, from the viewpoint of coating properties of the negative electrode mixture layer. The content of the thickening agent may be 5% by mass or less, is preferably 3% by mass or less, and is more preferably 2% by mass or less, based on the total amount of the positive electrode mixture layer, from the viewpoint of suppressing a decrease in battery capacity or an increase in resistance between the negative electrode active materials.

In one embodiment, the electrolytic solution contains a compound represented by the following formula (1), an electrolyte salt and a non-aqueous solvent,

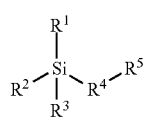

(1)

wherein $R^1$ to $R^3$ each independently represent an alkyl group or a fluorine atom, $R^4$ represents an alkylene group, and $R^5$ represents an organic group containing a nitrogen atom.

The number of carbon atoms of the alkyl group represented by $R^1$ to $R^3$ may be 1 or more and 3 or less. $R^1$ to $R^3$ may be a methyl group, an ethyl group or a propyl group, and may be any of a straight-chain group and a branched-chain group. At least one of $R^1$ to $R^3$ is preferably a fluorine atom.

The number of carbon atoms of the alkylene group represented by $R^4$ may be 1 or more, or 2 or more, and 5 or less, or 4 or less. The alkylene group represented by $R^4$ may be a methylene group, an ethylene group, a propylene group, a butylene group or a pentylene group, and may be any of a straight-chain group and a branched-chain group.

$R^5$ may be a group represented by the following formula (2) in one embodiment, from the viewpoint of further reducing the resistance of the electrochemical device and further improving the low-temperature input characteristics,

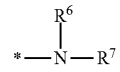

(2)

wherein $R^6$ and $R^7$ each independently represent a hydrogen atom or an alkyl group. The alkyl group represented by $R^6$ or $R^7$ may be the same as the alkyl group represented by $R^1$ to $R^3$ described above; and * represents a bond.

In one embodiment, the number of silicon atoms in one molecule of the compound represented by the formula (1) is one. In other words, in one embodiment, an organic group represented by $R^5$ does not contain a silicon atom.

The content of the compound represented by the formula (1) is preferably 0.001% by mass or more, based on the total amount of the electrolytic solution, and is more preferably 0.005% by mass or more, and is further preferably 0.01% by mass or more, from the viewpoint of further reducing the resistance of the electrochemical device and further improving the low-temperature input characteristics. From the same viewpoint, the content of the compound represented by the formula (1) is preferably 10% by mass or less, 7% by mass or less, 5% by mass or less, 3% by mass or less, 2% by mass or less, 1.5% by mass or less, or 1% by mass or less, based on the total amount of the electrolytic solution. The content of the compound represented by the formula (1) is preferably 0.001 to 10% by mass, 0.001 to 7% by mass, 0.001 to 5% by mass, 0.001 to 3% by mass, 0.001 to 2% by mass, 0.001 to 1.5% by mass, 0.001 to 1% by mass, 0.005 to 10% by mass, 0.005 to 7% by mass, 0.005 to 5% by mass, 0.005 to 3% by mass, 0.005 to 2% by mass, 0.005 to 1.5% by mass, 0.005 to 1% by mass, 0.01 to 10% by mass, 0.01 to 7% by mass, 0.01 to 5% by mass, 0.01 to 3% by mass, 0.01 to 2% by mass, 0.01 to 1.5% by mass, or 0.01 to 1% by mass, based on the total amount of the electrolytic solution, from the viewpoint of further improving the low-temperature input characteristics of the electrochemical device.

The electrolyte salt may be a lithium salt, for example.

Examples of the lithium salt may be at least one selected from the group consisting of $LiPF_6$, $LiBF_4$, $LiClO_4$, $LiB(C_6H_5)_4$, $LiCH_3SO_3$, $CF_3SO_2OLi$, $LiN(SO_2F)_2$ (Li[FSI], lithium bis(fluorosulfonyl)imide), $LiN(SO_2CF_3)_2$(Li[TFSI], lithium bis(trifluoromethane sulfonyl)imide), and $LiN(SO_2CF_2CF_3)_2$. The lithium salt preferably contains $LiPF_6$, from the viewpoint of further being excellent in solubility to a solvent, charge/discharge characteristics of a secondary battery, output characteristics, cycle characteristics and the like.

The concentration of the electrolyte salt is preferably 0.5 mol/L or higher, more preferably 0.7 mol/L or higher, further preferably 0.8 mol/L or higher, based on the total amount of the non-aqueous solvent, and is preferably 1.5 mol/L or lower, more preferably 1.3 mol/L or lower, and further preferably 1.2 mol/L or lower, from the viewpoint of excellent charge/discharge characteristics.

The examples of the non-aqueous solvent include ethylene carbonate, propylene carbonate, dimethyl carbonate, diethyl carbonate, methyl ethyl carbonate, γ-butyl lactone, acetonitrile, 1,2-dimethoxyethane, dimethoxymethane, tetrahydrofuran, dioxolane, methylene chloride, and methyl acetate. The non-aqueous solvent may be one type alone or a mixture of two or more of these solvents, and is preferably the mixture of two or more.

The electrolytic solution may further contain other materials than the compound represented by the formula (1), the electrolyte salt and the solvent. Other materials may be, for example, a heterocyclic compound containing nitrogen, sulfur, or nitrogen and sulfur, a cyclic carboxylic acid ester, a fluorine-containing cyclic carbonate, other compounds having an unsaturated bond in a molecule, or the like.

The present inventors have studied compounds which have various structures and functional groups, and as a result, have revealed that the low-temperature input characteristics have been remarkably improved and the resistance has been reduced by applying the compound represented by the above formula (1) to the electrolytic solution. The present inventors assume the effects of using the compound represented by the formula (1) in the electrolytic solution to be as follows. The compound represented by the formula (1) forms a stable film on the positive electrode or the negative electrode. Thereby, the lowering of the output characteristics at the low temperature is suppressed, which originates in the deposition of a decomposed product of the electrolytic solution on the positive electrode or the negative electrode. Furthermore, the lowering of the capacity at the low temperature and the increase of the resistance are suppressed, which originate in the decomposition of the electrolyte salt. As a result, the low-temperature input characteristics of the non-aqueous electrolytic solution secondary battery 1 are improved. Furthermore, the compound represented by the formula (1) itself has a skeleton containing Si, and thereby generation of gas derived from the compound is reduced, and the volume expansion can be suppressed which occurs when the non-aqueous electrolytic solution secondary battery 1 is stored at high temperature.

Subsequently, a method for manufacturing the non-aqueous electrolytic solution secondary battery 1 will be described. The method for manufacturing the non-aqueous electrolytic solution secondary battery 1 includes: a first step of obtaining the positive electrode 6; a second step of obtaining the negative electrode 8; a third step of accommodating the electrode group 2 in the battery outer package 3; and a fourth step of injecting an electrolytic solution into the battery outer package 3.

In the first step, the positive electrode 6 is obtained by: dispersing a material to be used for the positive electrode mixture layer 10 in a dispersion medium by using a kneader, a disperser or the like to obtain a slurry-like positive electrode mixture; then applying the positive electrode mixture onto the positive electrode current collector 9 by a doctor blade method, a dipping method, a spray method or the like; and then volatilizing the dispersion medium. After volatilization of the dispersion medium, a step of compression molding using a roll press may be provided as needed. The above steps from the application of the positive electrode mixture to the volatilization of the dispersion medium may be performed a plurality of times, and thereby the positive electrode mixture layer 10 may be formed as a positive electrode mixture layer having a multilayer structure. The dispersion medium may be water, 1-methyl-2-pyrrolidone (hereinafter also referred to as NMP), or the like.

The second step may be the same step as the first step described above, and the method of forming the negative electrode mixture layer 12 on the negative electrode current collector 11 may be the same method as the first step described above.

In the third step, the separator 7 is sandwiched between the produced positive electrode 6 and negative electrode 8, and the electrode group 2 is formed. Next, the electrode group 2 is accommodated in the battery outer package 3.

In the fourth step, the electrolytic solution is injected into the battery outer package 3. The electrolytic solution can be prepared, for example, by firstly dissolving an electrolyte salt in a solvent, and then dissolving other materials thereinto.

As for another embodiment, the electrochemical device may be a capacitor. The capacitor may include, similarly to the non-aqueous electrolytic solution secondary battery 1 described above, the electrode group including the positive electrode, the negative electrode and the separator, and a bag-shaped battery outer package which accommodates the electrode group. The details of each component in the capacitor may be the same as those of the non-aqueous electrolytic solution secondary battery 1.

EXAMPLES

The present invention will be specifically described below with reference to Examples, but the present invention is not limited to these Examples.

Example 1

[Production of Positive Electrode]
Fibrous graphite (1% by mass) and acetylene black (AB) (1% by mass) of electroconductive agents, and a binder (3% by mass) were sequentially added to and mixed with lithium cobaltate (95% by mass) of a positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 µm. After that, the dispersion medium was volatilized, then the resultant mixture was compressed to a density of 3.6 g/cm$^3$ by pressing, and a positive electrode was obtained.

[Production of Negative Electrode]
A binder and carboxymethylcellulose of a thickening agent were added to graphite of a negative electrode active material. Mass ratios among the materials were set to be negative electrode active material:binder:thickening agent=98:1:1. To the obtained mixture, water was added as a dispersion medium, and the mixture was kneaded to prepare a slurry-like negative electrode mixture. A predetermined amount of this negative electrode mixture was evenly and uniformly applied to a rolled copper foil which was a negative electrode current collector and had a thickness of 10 µm. After that, the dispersion medium was volatilized, then the resultant mixture was compressed to a density of 1.6 g/cm$^3$ by pressing, and a negative electrode was obtained.

[Production of Lithium Ion Secondary Battery]
The positive electrode which was cut into a 13.5 cm$^2$ square was sandwiched by polyethylene porous sheets (trade name: Hypore (registered trademark), manufactured by Asahi Kasei Corporation and thickness of 30 µm) which were separators; then, the negative electrode which was cut into a 14.3 cm$^2$ square was further overlapped thereon; and an electrode group was produced. This electrode group was accommodated in a container (battery outer package) formed of a laminate film made from aluminum (trade name: aluminum laminate film, manufactured by Dai Nippon Printing Co., Ltd.). Subsequently, 1 mL of an electrolytic solution was added into the container, the container was heat-welded, and the lithium ion secondary battery for evaluation was produced. As the electrolytic solution, a solution was used which was prepared by adding 1% by mass of vinylene carbonate (VC) with respect to the total amount of the following mixed solution, and 1% by mass (based on the total amount of electrolytic solution) of the compound A which was represented by the following formula (3), based on the total amount of the electrolytic solution, into the mixed solution which contained ethylene carbonate containing 1 mol/L of $LiPF_6$, dimethyl carbonate and diethyl carbonate.

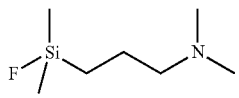

(3)

Comparative Example 1

A lithium ion secondary battery was produced in the same manner as in Example 1, except that the compound A was not used in Example 1.

[Initial Charge/Discharge]

The produced lithium ion battery was subjected to the initial charge/discharge by the following method. Firstly, constant current charge was performed up to an upper limit voltage of 4.2 V at a current value of 0.1 C in an environment of 25° C., and then constant-voltage charge was performed at 4.2 V. The charge termination condition was set at a current value of 0.01 C. After that, constant current discharge was performed at a current value of 0.1 C to a final voltage of 2.5 V. This charge/discharge cycle was repeated three times ("C" used as a unit of current value means "current value (A)/battery capacity (Ah)").

[Resistance Measurement by AC Impedance Measurement (Upper Limit Voltage of 4.2 V)]

Figure 3:
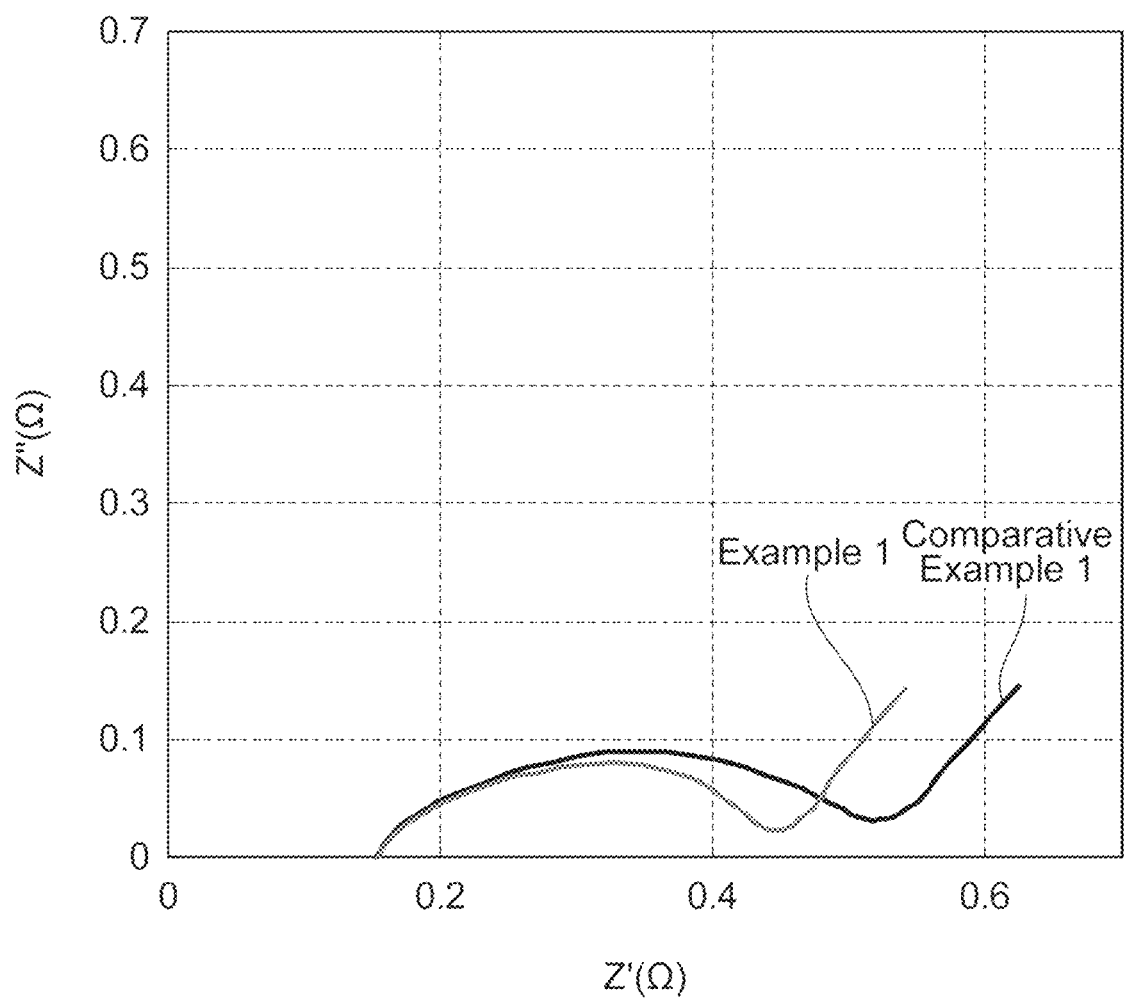
FIG. 3 shows a graph showing measurement results of resistances in Example 1 and Comparative Example 1.

After the initial charge/discharge, the resistances of the lithium ion secondary batteries of Example 1 and Comparative Example 1 were evaluated by AC impedance measurement. The produced lithium ion batteries were subjected to the constant current charge at a current value of 0.1 C in an environment of 25° C. up to the upper limit voltage of 4.2 V, and were each subsequently subjected to the constant-voltage charge at 4.2 V. The charge termination condition was set at a current value of 0.01 C. Resistances of these lithium ion secondary batteries were measured with the use of an AC impedance measuring device (1260 type, manufactured by Solartron Analytical) in a frequency range of 20 mHz to 200 kHz with an amplitude of 10 mV in an environment of 25° C. The measurement results are shown in FIG. 3.

[Evaluation of Low-Temperature Input Characteristics]

After the initial charge/discharge, the low-temperature input characteristics of each of the secondary batteries of Example 1 and Comparative Example 1 were evaluated. Specifically, firstly, constant current charge at 0.1 C was performed up to the upper limit voltage of 4.2 V in an environment of 25° C. The capacity at the time of this charging was defined to be a charging capacity C1 at 25° C. Next, the constant current discharge was performed at a current value of 0.1 C to a final voltage of 2.5 V in an environment of 25° C. After that, the samples were held for 1 hour in an environment of −10° C., and then, in the state of −10° C., were subjected to constant current charge at 0.1 C up to the upper limit voltage of 4.2 V. The charging capacity at the time of this charging was defined to be a charging capacity C2 at a low temperature (−10° C.). Then, the low-temperature input characteristics were computed according to the following expression. The results are shown in Table 1.

Low-temperature input characteristics (%)=C2/C1×100

TABLE 1

|  | Example 1 | Comparative Example 1 |
|---|---|---|
| Low-temperature input characteristics (%) | 80.7 | 76.4 |

Example 2

A lithium ion secondary battery was produced in the same manner as in Example 1, except that silicon oxide was further added as the negative electrode active material in Example 1, and the negative electrode was produced. Mass ratios among the negative electrode active material, the binder and the thickening agent in the negative electrode were set to be graphite:siliconoxide:binder:thickening agent=92:5:1.5:1.5.

Examples 3 to 4

Lithium ion secondary batteries were produced in the same manner as in Example 2, except that the contents of the compound A in Example 2 were changed to 0.5% by mass (Example 3) and 0.1% by mass (Example 4), respectively, based on the total amount of the electrolytic solution.

Comparative Example 2

A lithium ion secondary battery was produced in the same manner as in Example 2, except that the compound A was not used in Example 2.

Comparative Example 3

A lithium ion secondary battery was produced in the same manner as in Example 2, except that 4-fluoro-1,3-dioxolan-2-one (fluoroethylene carbonate; FEC) instead of the compound A in Example 2 was added in an amount of 1% by mass based on the total amount of the electrolytic solution.

[Initial Charge/Discharge]

Each of the secondary batteries of Examples 2 to 4 and Comparative Examples 2 to 3 was subjected to the initial charge/discharge by the same method as the method in Example 1 and Comparative Example 1.

[Resistance Measurement by AC Impedance Measurement (Upper Limit Voltage of 4.2 V)]

Figure 4:
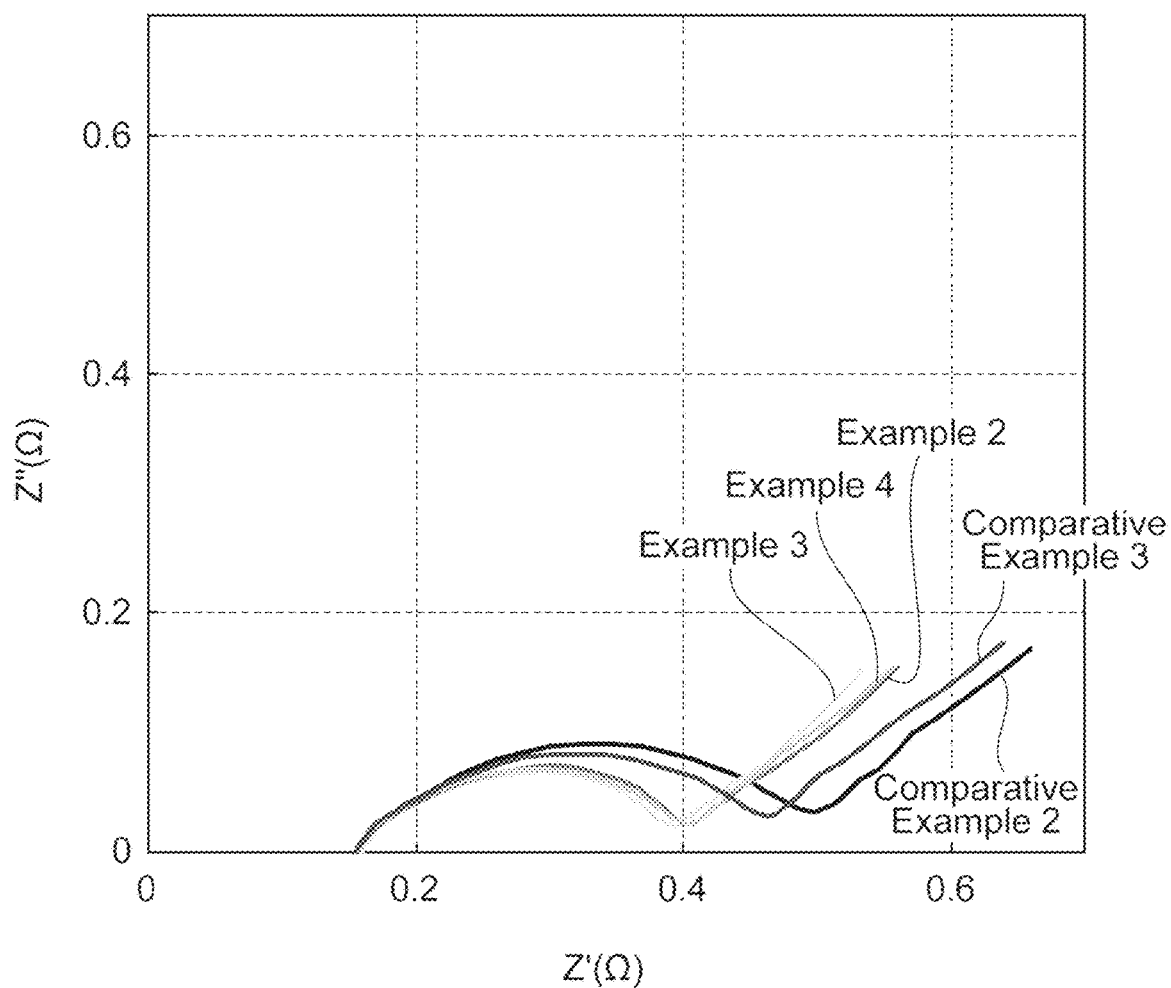
FIG. 4 shows a graph showing measurement results of resistances in Examples 2 to 4 and Comparative Examples 2 to 3.

The resistance of each of the secondary batteries of Examples 2 to 4 and Comparative Examples 2 to 3 was measured by the same method as in the evaluations in Example 1 and Comparative Example 1. The results are shown in FIG. 4.

[Evaluation of Cycle Characteristics]

Figure 5:
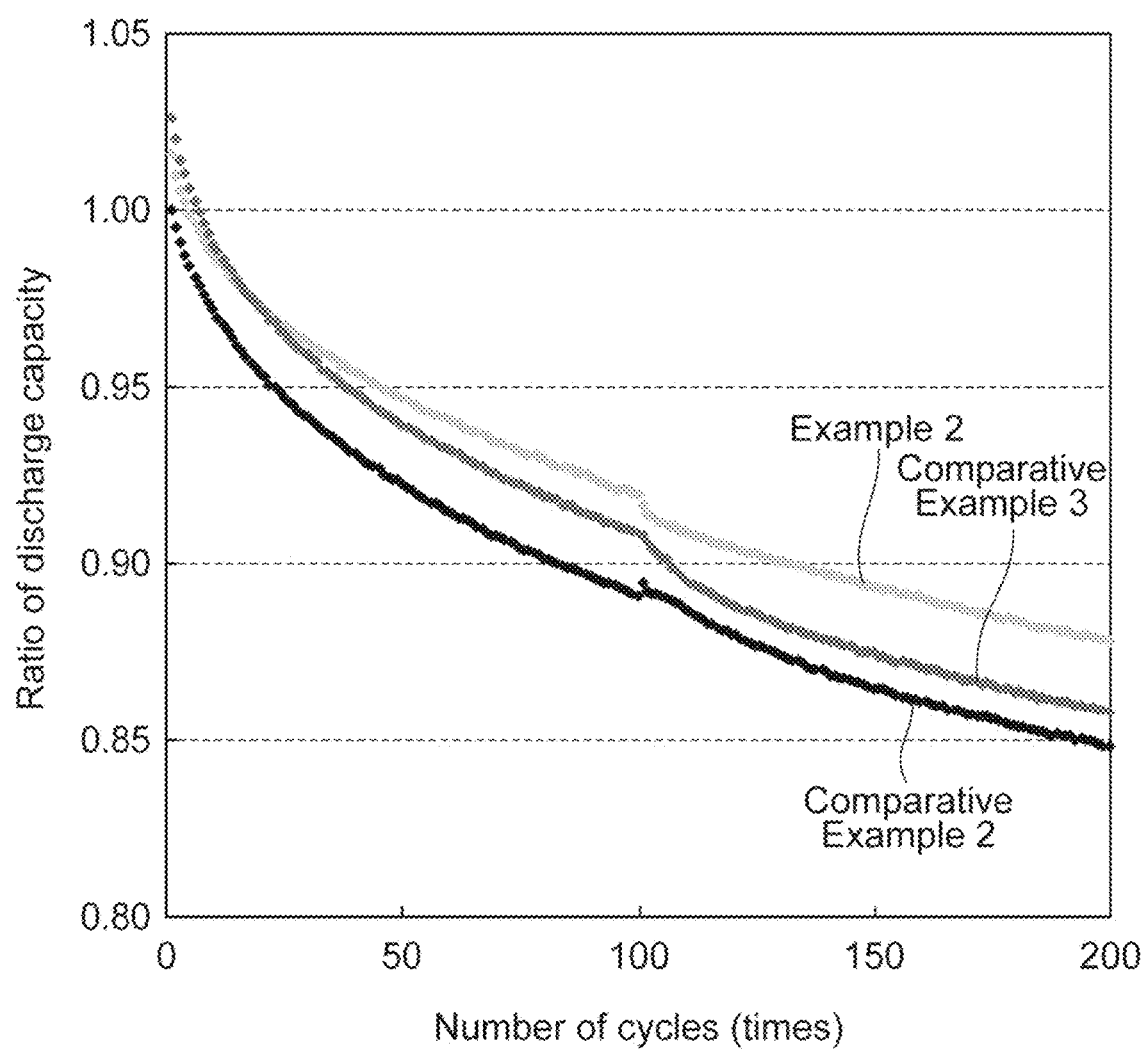
FIG. 5 shows a graph showing evaluation results of cycle characteristics of Example 2 and Comparative Examples 2 to 3.

The cycle characteristics of each of the secondary batteries in Example 2 and Comparative Examples 2 to 3 were evaluated by a cycle test in which charge/discharge was repeated after the initial charge/discharge. As for a charging pattern, the secondary batteries of Example 2 and Comparative Examples 2 to 3 were subjected to the constant current charge at a current value of 0.5 C up to an upper limit voltage of 4.2 V, and then were subjected to the constant-voltage charge at 4.2 V, in an environment of 45° C. The charge termination condition was set at a current value of 0.05 C. As for discharge, the constant current discharge was performed at 1 C up to 2.5 V, and the discharge capacity was determined. This series of charge/discharge was repeated 200 cycles, and the discharge capacity was measured each time of the charge/discharge. The discharge capacity after the charge/discharge in the first cycle in Comparative Example 2 was determined to be 1, and relative values of the discharge capacities (ratio of discharge capacity) in Example 2 and Comparative Example 3 in each cycle were determined. FIG. 5 shows the relationship between the number of cycles and the relative values of the discharge capacities.

[Evaluation of Low-Temperature Input Characteristics]

The low-temperature input characteristics of each of the secondary batteries of Examples 2 to 4 and Comparative Example 2 were evaluated by the same method as in the evaluations in Example 1 and Comparative Example 1. The results are shown in Table 2.

TABLE 2

| | Example 2 | Example 3 | Example 4 | Comparative Example 2 |
|---|---|---|---|---|
| Low-temperature input characteristics (%) | 77.1 | 77.1 | 76.6 | 75.9 |

As shown in FIG. 3 and Table 1, in the lithium ion secondary battery of Example 1, in which graphite was used as the negative electrode active material, and furthermore, to which an electrolytic solution containing 1% by mass of the compound A was applied, the resistance was reduced and input characteristics at low temperature (−10° C.) were satisfactory, as compared with the lithium ion secondary battery of Comparative Example 1, to which an electrolytic solution containing no compound A was applied. In addition, as shown in FIG. 4 and Table 2, in the lithium ion secondary batteries of Examples 2 to 4, in which a negative electrode active material containing graphite and silicon oxide was used, and furthermore, to which electrolytic solutions containing the compound A respectively in amounts of 1, 0.5 and 0.1% by mass were applied, the resistance was reduced and the input characteristics at low temperature (−10° C.) were satisfactory, as compared with a lithium ion secondary battery of Comparative Example 2 containing no compound A. The mechanism by which these characteristics were improved is not necessarily clear, but the reason is considered to be because the film was formed on the positive or negative electrode by the addition of the compound A, the film being stable and having a satisfactory ion-conductivity, and because by the interaction between the compound A and the lithium ion, the lithium salt ($LiPF_6$) was stabilized, or activation energy for desolvation of lithium decreased.

As shown in FIG. 5, in the lithium ion secondary battery of Example 2, in which a negative electrode active material containing graphite and silicon oxide was used, and furthermore, to which an electrolytic solution containing 1% by mass of the compound A was applied, cycle characteristics were satisfactory, as compared with the lithium ion secondary batteries of Comparative Examples 2 to 3, which did not contain the compound A. The mechanism by which these cycle characteristics were improved is not necessarily clear, but the reason is considered to be because the film was formed by the addition of the compound A, the film being more stable on the positive or negative electrode than the film which is formed due to the influence of FEC, and having a more satisfactory ion-conductivity, and because thus formed film contributed to the suppression of the decomposition of the electrolytic solution and further to the stabilization of the lithium salt ($LiPF_6$).

Example 5

[Production of Positive Electrode]

Acetylene black (AB) (5% by mass) of the electroconductive agent, and a binder (4% by mass) were sequentially added to and mixed with lithium nickel cobalt manganate ($LiNi_{1/3}Co_{1/3}Mn_{1/3}O_2$, 91% by mass) of a positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 μm. After that, the dispersion medium was volatilized, then the resultant mixture was compressed to a density of 2.8 g/cm$^3$ by pressing, and a positive electrode was obtained.

[Production of Negative Electrode]

A negative electrode was obtained by the same method as in Example 1, except that the density at the time when the mixture was compressed was changed to 1.2 g/cm$^3$.

[Production of Lithium Ion Secondary Battery]

A lithium ion secondary battery for evaluation was produced by the same method as in Example 1. As the electrolytic solution, a solution was used which was prepared by adding 1% by mass of vinylene carbonate (VC) with respect to the total amount of the following mixed solution, and 0.2% by mass (based on total amount of electrolytic solution) of the above compound A, into the mixed solution which contained ethylene carbonate containing 1 mol/L of $LiPF_6$, dimethyl carbonate and diethyl carbonate.

Example 6

A lithium ion secondary battery was produced in the same manner as in Example 5, except that the content of the compound A in Example 5 was changed to 0.5% by mass based on the total amount of the electrolytic solution.

Comparative Example 4

A lithium ion secondary battery was produced in the same manner as in Example 5, except that the compound A was not used in Example 5.

[Initial Charge/Discharge]

Each of the secondary batteries of Examples 5 to 6 and Comparative Example 4 was subjected to the initial charge/discharge by the same method as the method in Example 1 and Comparative Example 1, except that the final voltage of the constant current discharge was set at 2.7 V.

[Resistance Measurement by AC Impedance Measurement (Upper Limit Voltage of 4.2 V)]

Figure 6:
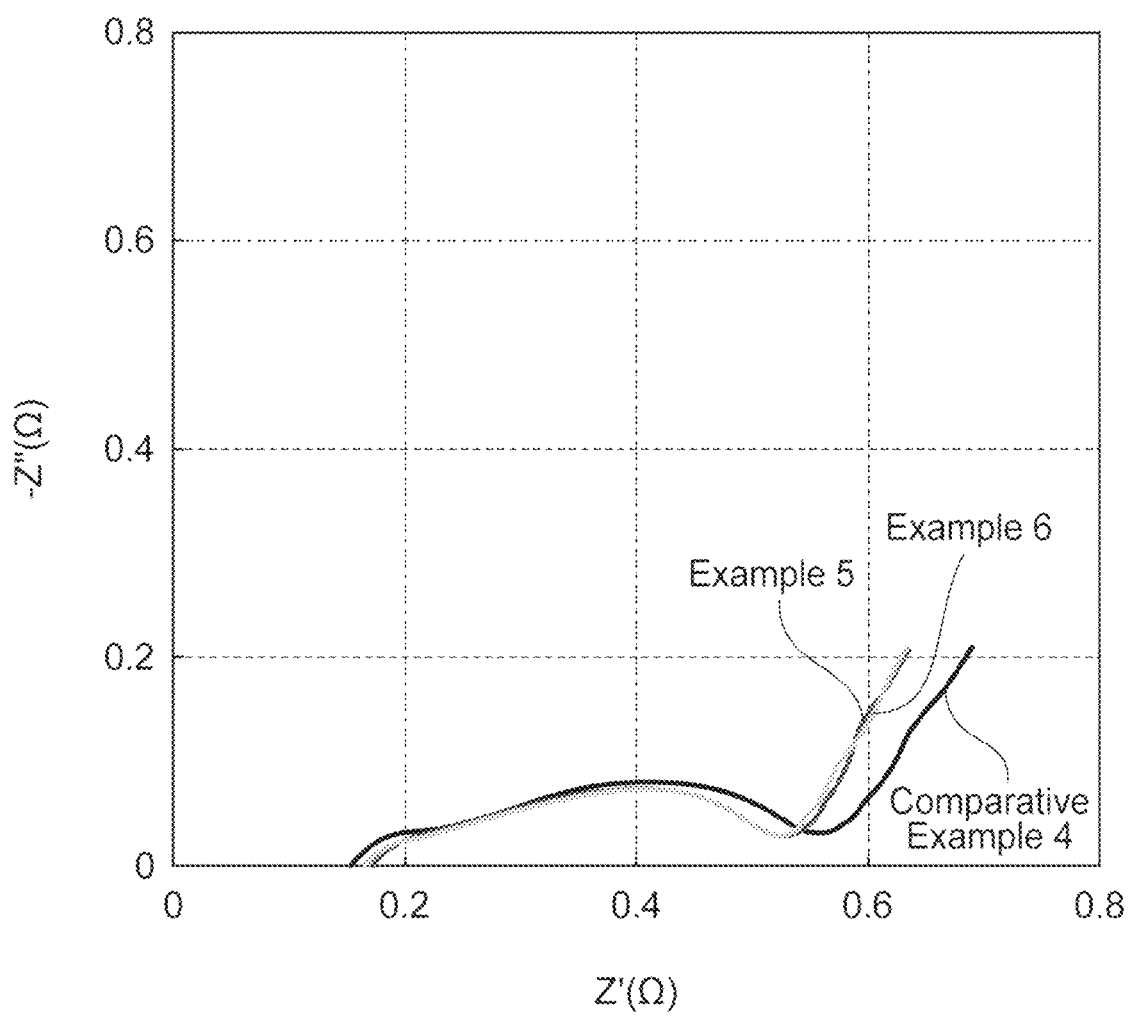
FIG. 6 shows a graph showing measurement results of resistances (at upper limit voltage of 4.2 V) in Examples 5 to 6 and Comparative Example 4.

After the initial charge/discharge, the resistances of the lithium ion secondary batteries of Examples 5 to 6 and Comparative Example 4 were evaluated by the AC impedance measurement. The produced lithium ion batteries were subjected to the constant current charge at a current value of 0.2 C up to the upper limit voltage of 4.2 V in an environment of 25° C., and were each subsequently subjected to the constant-voltage charge at 4.2 V. The charge termination condition was set at a current value of 0.01 C. Resistances of these lithium ion secondary batteries were measured with the use of an AC impedance measuring device (VSP, Bio-Logic) in a frequency range of 20 mHz to 200 kHz with an amplitude of 10 mV in an environment of 25° C. The measurement results are shown in FIG. 6.

[Resistance Measurement by AC Impedance Measurement (Upper Limit Voltage of 4.3 V)]

Figure 7:
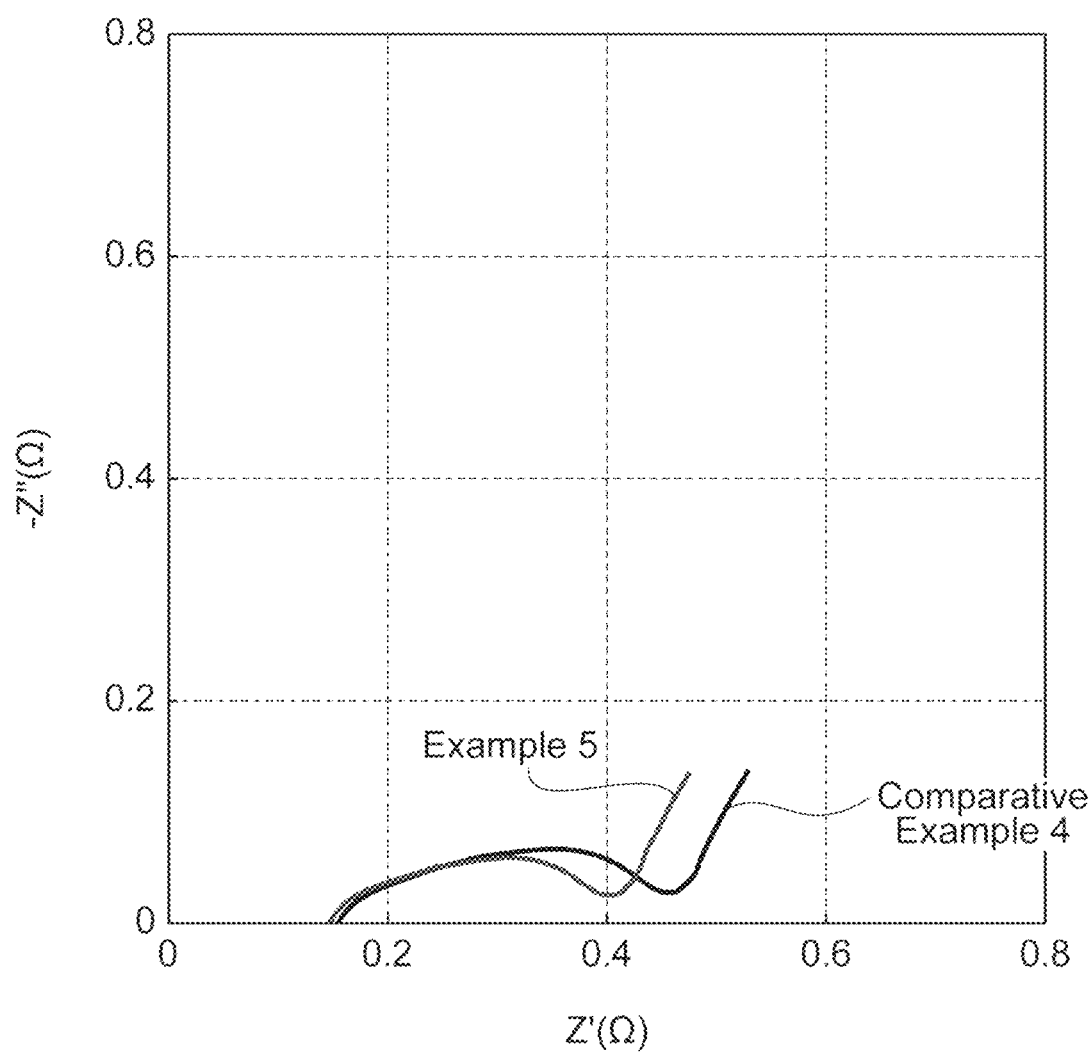
FIG. 7 shows a graph showing measurement results of resistances (at upper limit voltage of 4.3 V) in Example 5 and Comparative Example 4.

For each of the secondary batteries of Example 5 and Comparative Example 4, the resistance of each of the secondary batteries was measured by the same method as the method at the time when the upper limit voltage was set at 4.2 V, except that the upper limit voltage was set at 4.3 V. The measurement results are shown in FIG. 7.

Example 7

A lithium ion secondary battery was produced in the same manner as in Example 5, except that silicon oxide was further added as the negative electrode active material, the density at the time when the mixture was compressed was changed to 1.6 g/cm$^3$, and the negative electrode was produced, in Example 5. Mass ratios among the negative electrode active material, the binder and the thickening agent in the negative electrode were set to be graphite:siliconoxide:binder:thickening agent=92:5:1.5:1.5.

Example 8

A lithium ion secondary battery was produced in the same manner as in Example 7, except that the content of the compound A was changed to 0.5% by mass based on the total amount of the electrolytic solution, in Example 7.

Comparative Example 5

A lithium ion secondary battery was produced in the same manner as in Example 7, except that the compound A was not used in Example 7.

[Initial Charge/Discharge]

Each of the secondary batteries of Examples 7 to 8 and Comparative Example 5 was subjected to the initial charge/discharge by the same method as the method in Examples 5 to 6 and Comparative Example 4.

[Resistance Measurement by AC Impedance Measurement (Upper Limit Voltage of 4.2 V)]

Figure 8:
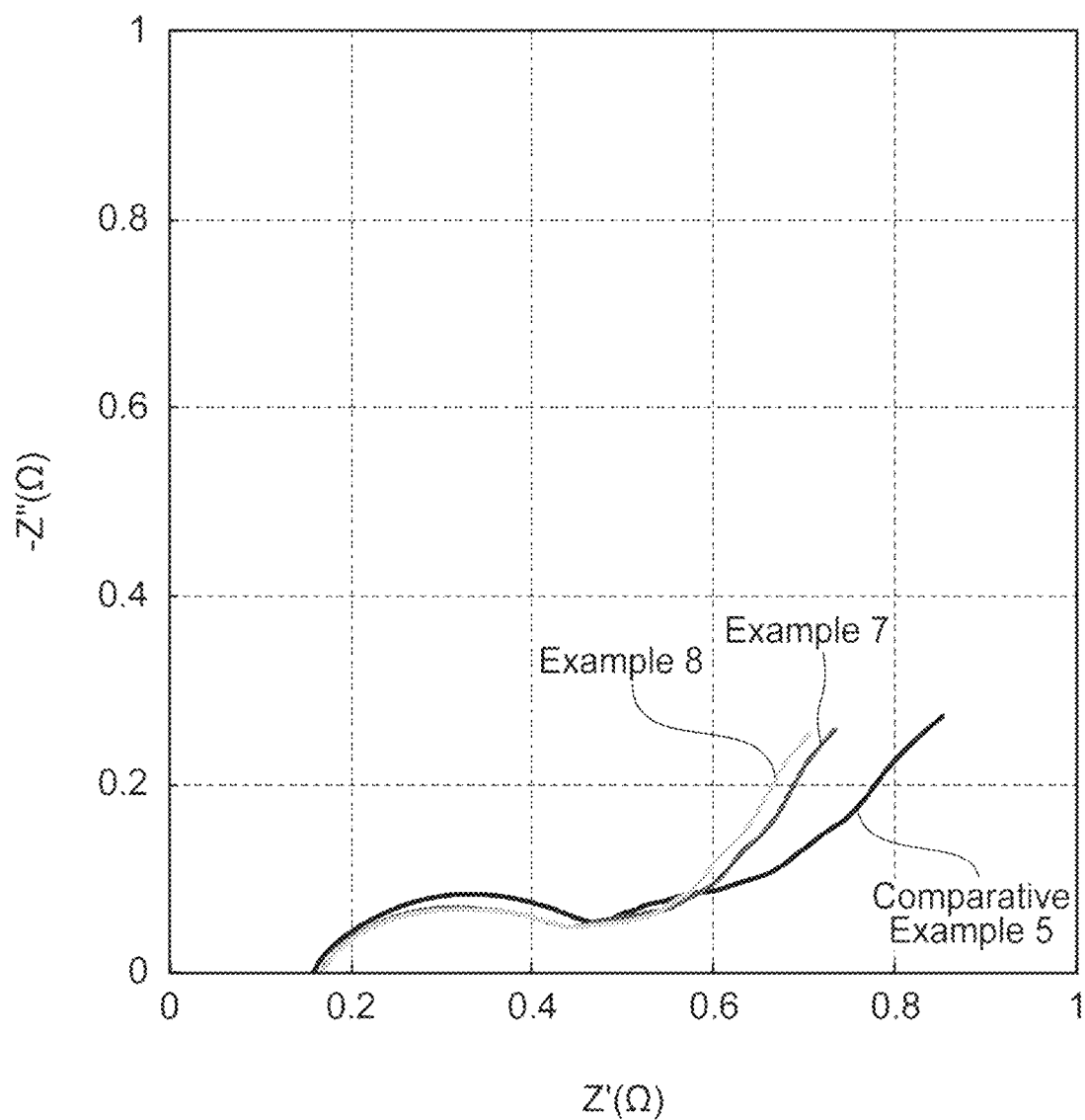
FIG. 8 shows a graph showing measurement results of resistances in Examples 7 to 8 and Comparative Example 5.

For each of the secondary batteries of Examples 7 to 8 and Comparative Example 5, the resistance of each of the secondary batteries was measured by the same method as the method in Examples 5 to 6 and Comparative Example 4 (the method at the time when the upper limit voltage was set at 4.2 V). The measurement results are shown in FIG. 8.

Example 9

A lithium ion secondary battery was produced in the same manner as in Example 5, except that lithium nickel cobalt manganate (LiNi$_{0.5}$Co$_{0.2}$Mn$_{0.3}$O$_2$) was used as the positive electrode active material, in Example 5.

Example 10

A lithium ion secondary battery was produced in the same manner as in Example 9, except that the content of the compound A in Example 9 was changed to 0.5% by mass based on the total amount of the electrolytic solution.

Comparative Example 6

A lithium ion secondary battery was produced in the same manner as in Example 9, except that the compound A was not used in Example 9.

[Initial Charge/Discharge]

Each of the secondary batteries of Examples 9 to 10 and Comparative Example 6 was subjected to the initial charge/discharge by the same method as the method in Examples 5 to 6 and Comparative Example 4.

[Resistance Measurement by AC Impedance Measurement (Upper Limit Voltage of 4.2 V)]

Figure 9:
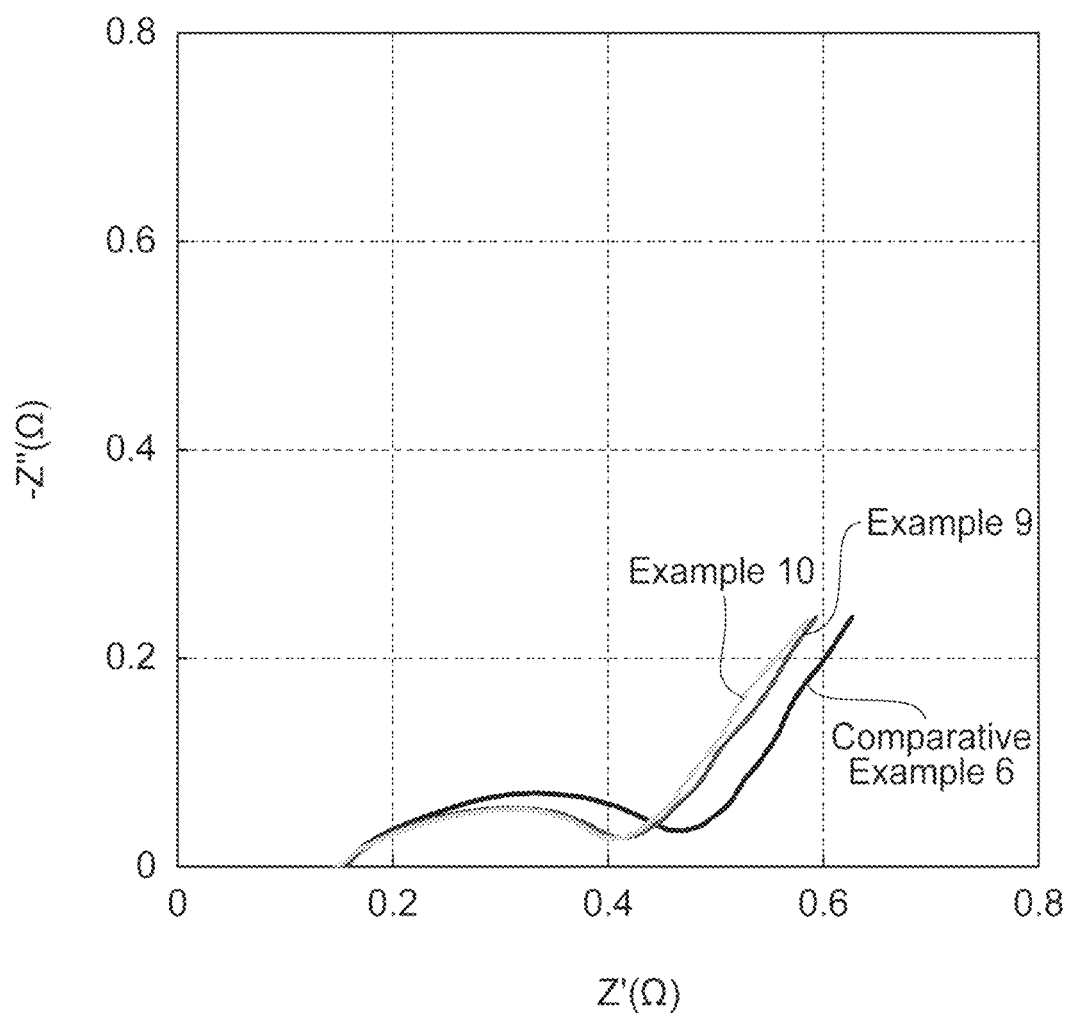
FIG. 9 shows a graph showing measurement results of resistances in Examples 9 to 10 and Comparative Example 6.

For each of the secondary batteries of Examples 9 to 10 and Comparative Example 6, the resistance of each of the secondary batteries was measured by the same method as the method in Examples 5 to 6 and Comparative Example 4 (the method at the time when the upper limit voltage was set at 4.2 V). The measurement results are shown in FIG. 9.

Example 11

A lithium ion secondary battery was produced in the same manner as in Example 5, except that lithium iron phosphate (90% by mass) was used as the positive electrode active material, the content of the binder was changed to 5% by mass, the density at the time when the mixture was compressed was changed to 2.0 g/cm$^3$, and then the positive electrode was produced, in Example 5.

Example 12

A lithium ion secondary battery was produced in the same manner as in Example 11, except that the content of the compound A in Example 11 was changed to 0.5% by mass based on the total amount of the electrolytic solution.

Comparative Example 7

A lithium ion secondary battery was produced in the same manner as in Example 11, except that the compound A was not used in Example 11.

[Initial Charge/Discharge]

Each of the secondary batteries of Examples 11 to 12 and Comparative Example 7 was subjected to the initial charge/discharge by the same method as the method in Examples 5 to 6 and Comparative Example 4.

[Resistance Measurement by AC Impedance Measurement (Upper Limit Voltage of 4.2 V)]

Figure 10:
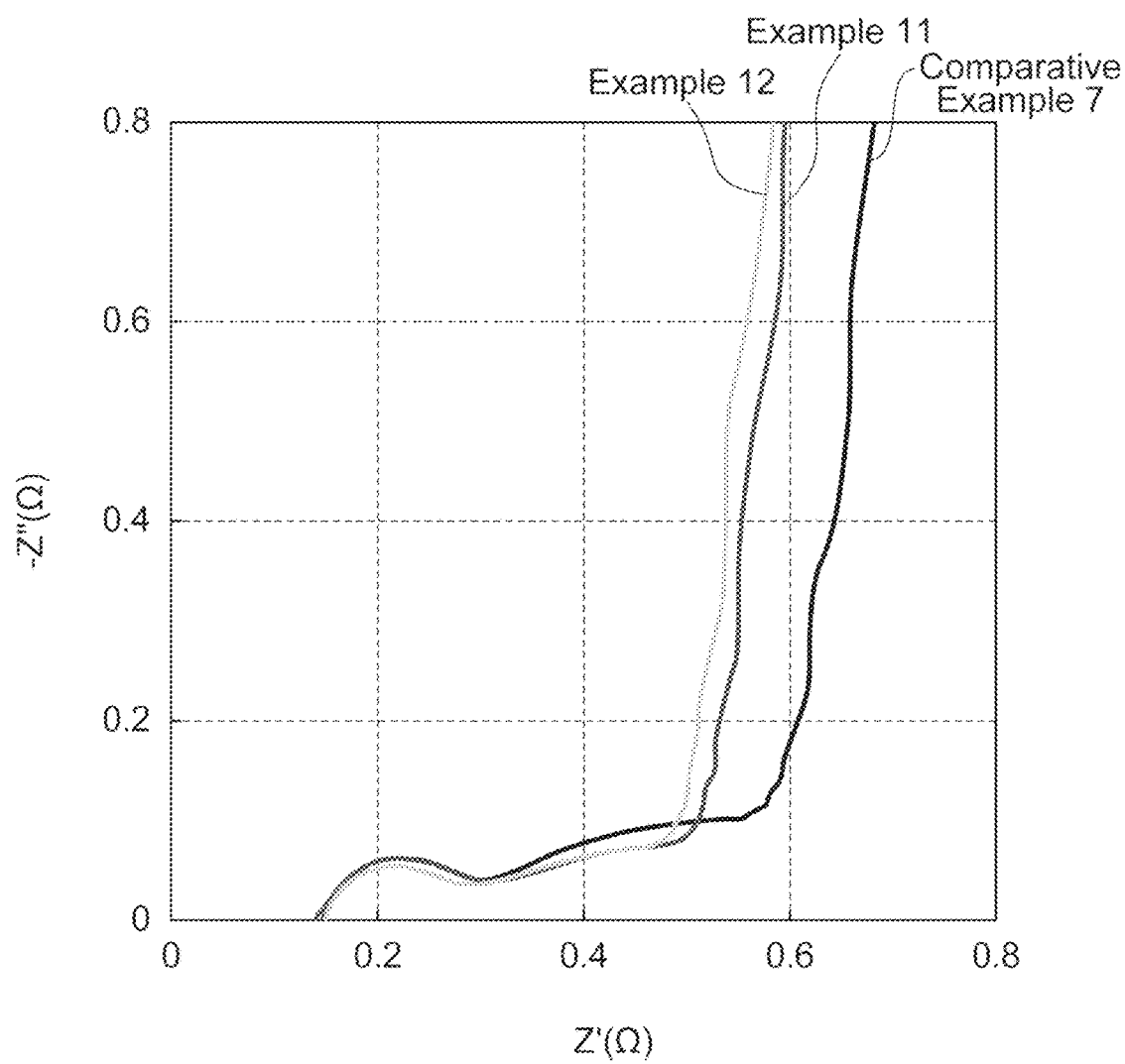
FIG. 10 shows a graph showing measurement results of resistances in Examples 11 to 12 and Comparative Example 7.

For each of the secondary batteries of Examples 11 to 12 and Comparative Example 7, the resistance of each of the secondary batteries was measured by the same method as the method in Examples 5 to 6 and Comparative Example 4 (the method at the time when the upper limit voltage was set at 4.2 V). The measurement results are shown in FIG. 10.

Example 13

[Production of Positive Electrode]

Acetylene black (AB) (5% by mass) of the electroconductive agent, and a binder (4% by mass) were sequentially added to and mixed with lithium nickel cobalt manganate (LiNi$_{0.6}$Co$_{0.2}$Mn$_{0.2}$O$_2$, 91% by mass) of a positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 μm. After that, the dispersion medium was volatilized, then the resultant mixture was compressed to a density of 2.8 g/cm$^3$ by pressing, and a positive electrode was obtained.

[Production of Negative Electrode]

A negative electrode was obtained by the same method as in Example 1.

[Production of Lithium Ion Secondary Battery]

A lithium ion secondary battery for evaluation was produced by the same method as in Example 1. As the electrolytic solution, a solution was used which was prepared by adding 1% by mass of vinylene carbonate (VC) with respect to the total amount of the following mixed solution, and 0.5% by mass (based on total amount of electrolytic solution) of the above compound A, into the mixed solution which contained ethylene carbonate containing 1 mol/L of $LiPF_6$, dimethyl carbonate and diethyl carbonate.

Example 14

A lithium ion secondary battery was produced in the same manner as in Example 13, except that the content of the compound A in Example 13 was changed to 0.2% by mass based on the total amount of the electrolytic solution.

Comparative Example 8

A lithium ion secondary battery was produced in the same manner as in Example 13, except that the compound A was not used in Example 13.

[Initial Charge/Discharge]

Each of the secondary batteries of Examples 13 to 14 and Comparative Example 8 was subjected to the initial charge/discharge by the same method as the method in Examples 5 to 6 and Comparative Example 4.

[Resistance Measurement by AC Impedance Measurement (Upper Limit Voltage of 4.2 V)]

Figure 11:
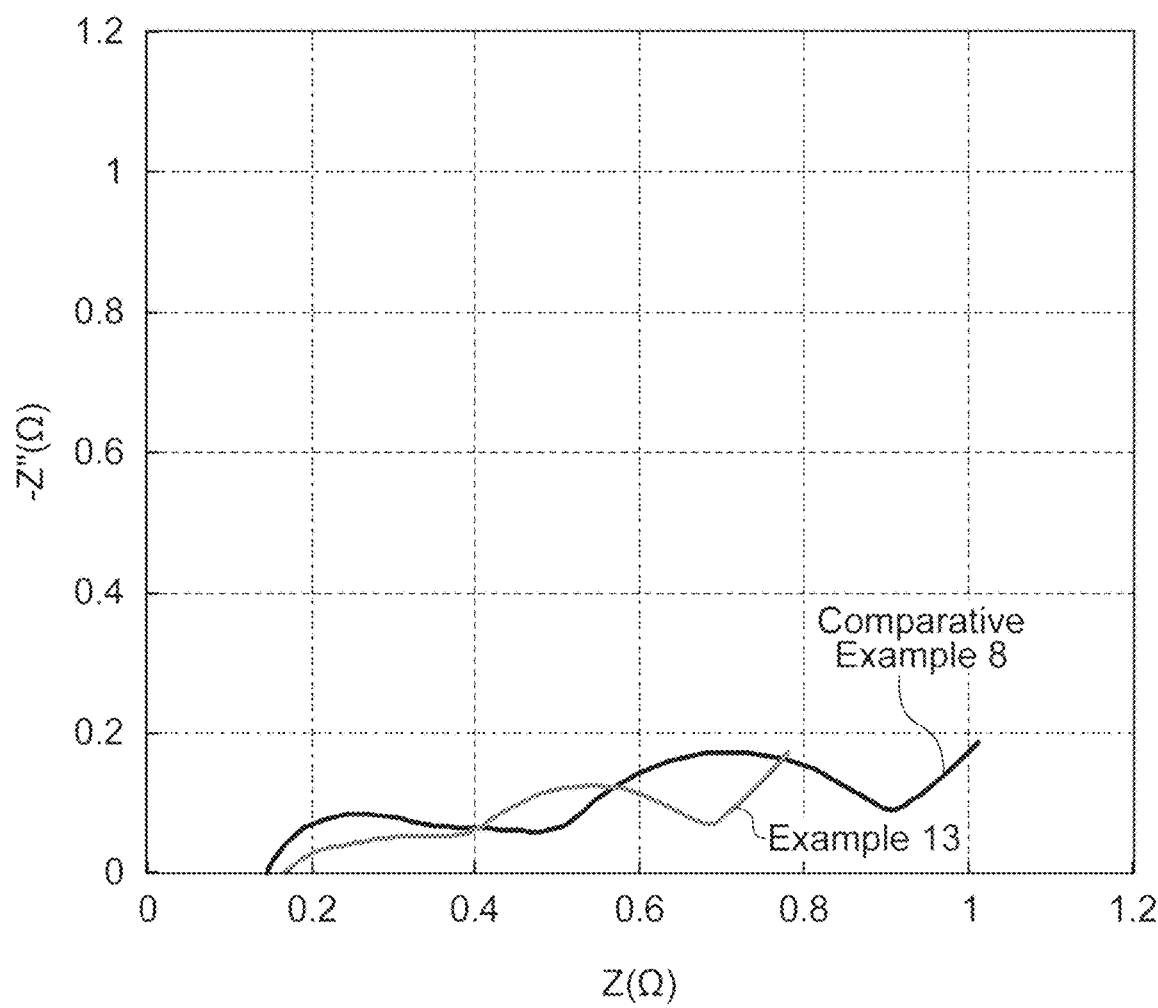
FIG. 11 shows a graph showing measurement results of resistances in Example 13 and Comparative Example 8.

For each of the secondary batteries of Example 13 and Comparative Example 8, the resistance of each of the secondary batteries was measured by the same method as the method in Examples 5 to 6 and Comparative Example 4 (the method at the time when the upper limit voltage was set at 4.2 V). The measurement results are shown in FIG. 11.

[Evaluation of Cycle Characteristics]

Figure 12:
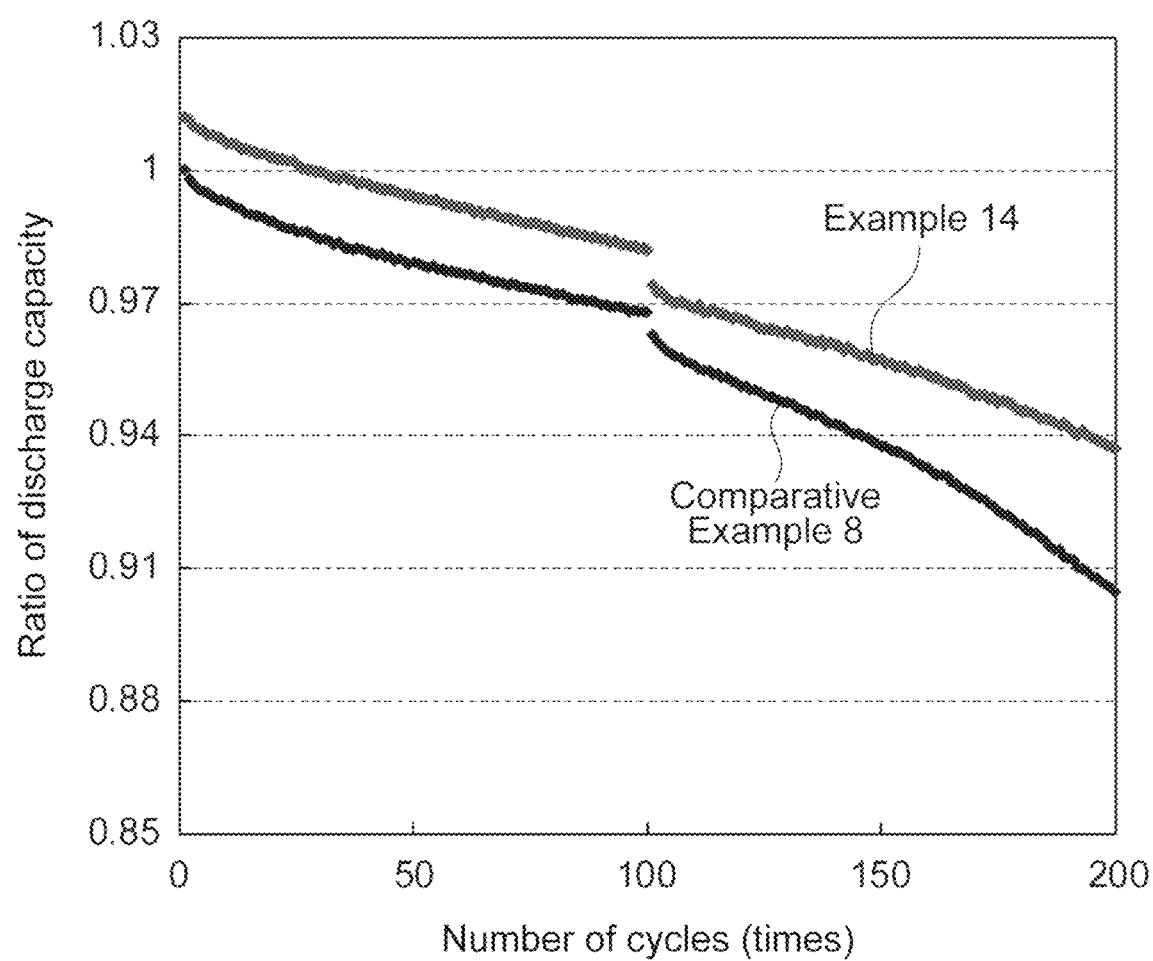
FIG. 12 shows a graph showing evaluation results of cycle characteristics of Example 14 and Comparative Example 8.

For each of the secondary batteries of Example 14 and Comparative Example 8, the cycle characteristics were evaluated by the same method as the evaluation method in Example 2 and Comparative Examples 2 to 3. The discharge capacity after the charge/discharge in the first cycle in Comparative Example 8 was determined to be 1, and relative values of the discharge capacities (ratio of discharge capacity) in Example 14 and Comparative Example 8 in each cycle were determined. FIG. 12 shows the relationship between the number of cycles and the relative values of the discharge capacities. The ratio of discharge capacity after 200 cycles in Example 14 is higher than the ratio of discharge capacity after the 200 cycles in Comparative Example 8, and it is understood that Example 14 is excellent in the cycle characteristics as compared with Comparative Example 8.

[Evaluation of Discharge Rate Characteristics]

Figure 13:
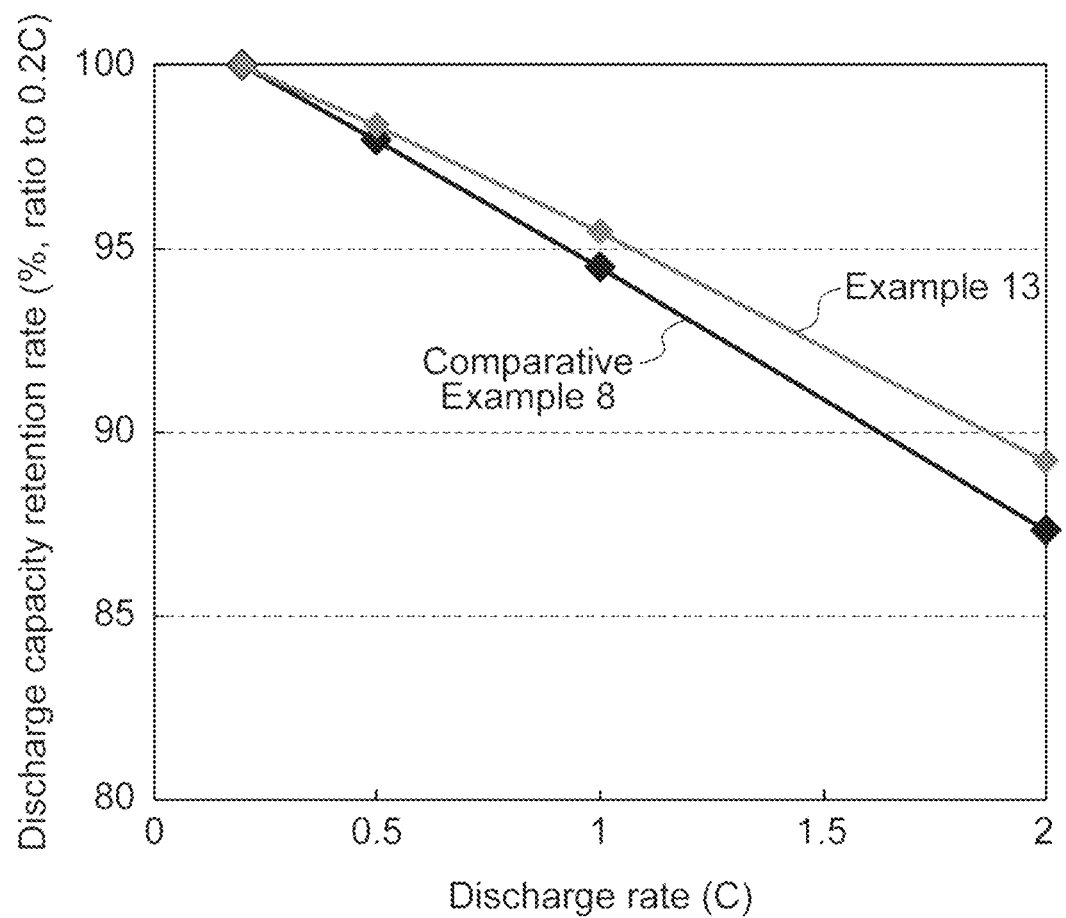
FIG. 13 shows a graph showing evaluation results of discharge rate characteristics of Example 13 and Comparative Example 8.

For each of the secondary batteries of Example 13 and Comparative Example 8, the output characteristics of the lithium ion secondary battery after the evaluation of the cycle characteristics were evaluated by the method shown below. A constant current charge of 0.2 C was performed up to the upper limit voltage of 4.2 V, and then a constant-voltage charge was performed at 4.2 V. The charge termination condition was set at a current value of 0.02 C. After that, the constant current discharge was performed at a current value of 0.2 C to a final voltage of 2.5 V, and the capacity at the time of this discharge was determined to be the discharge capacity at the current value of 0.2 C. Next, the constant current charge of 0.2 C was performed up to the upper limit voltage of 4.2 V, subsequently the constant-voltage charge was performed at 4.2 V (where the charge termination condition was set at the current value of 0.02 C), then the constant current discharge was performed at a current value of 0.5 C to the final voltage of 2.5 V, and the capacity at the time of this discharge was determined to be the discharge capacity at the current value of 0.5 C. The discharge capacities of 1 C and 2 C were evaluated from similar charge/discharge. The output characteristics were computed by the following expression. The evaluation results of Example 13 and Comparative Example 8 are shown in FIG. 13.

Discharge capacity retention rate (%)=(discharge capacity at current values of 0.2 C,0.5 C,1 C or 2 C/discharge capacity at current value of 0.2 C)×100

Example 15

[Production of Positive Electrode]

Acetylene black (AB) (3% by mass) of the electroconductive agent and a binder (2% by mass) were sequentially added to and mixed with lithium nickel cobalt aluminate (95% by mass) of the positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 μm. After that, the dispersion medium was volatilized, then the resultant mixture was compressed to a density of 3.0 g/cm$^3$ by pressing, and a positive electrode was obtained.

[Production of Negative Electrode]

A negative electrode was obtained by the same method as in Example 1.

[Production of Lithium Ion Secondary Battery]

A lithium ion secondary battery for evaluation was produced by the same method as in Example 1. As the electrolytic solution, a solution was used which was prepared by adding 1% by mass of vinylene carbonate (VC) with respect to the total amount of the following mixed solution, and 0.1% by mass (based on total amount of electrolytic solution) of the above compound A, into the mixed solution which contained ethylene carbonate containing 1 mol/L of $LiPF_6$, dimethyl carbonate and diethyl carbonate.

Comparative Example 9

A lithium ion secondary battery was produced in the same manner as in Example 13, except that the compound A was not used in Example 15.

Comparative Example 10

A lithium ion secondary battery was produced in the same manner as in Example 15, except that 0.5% by mass of FEC in place of the compound A in Example 15 was added based on the total amount of the electrolytic solution.

[Initial Charge/Discharge]

Each of the secondary batteries of Example 15 and Comparative Examples 9 to 10 was subjected to the initial charge/discharge by the same method as the method in Examples 5 to 6 and Comparative Example 4.

[Resistance Measurement by AC Impedance Measurement (Upper Limit Voltage of 4.2 V)]

Figure 14:
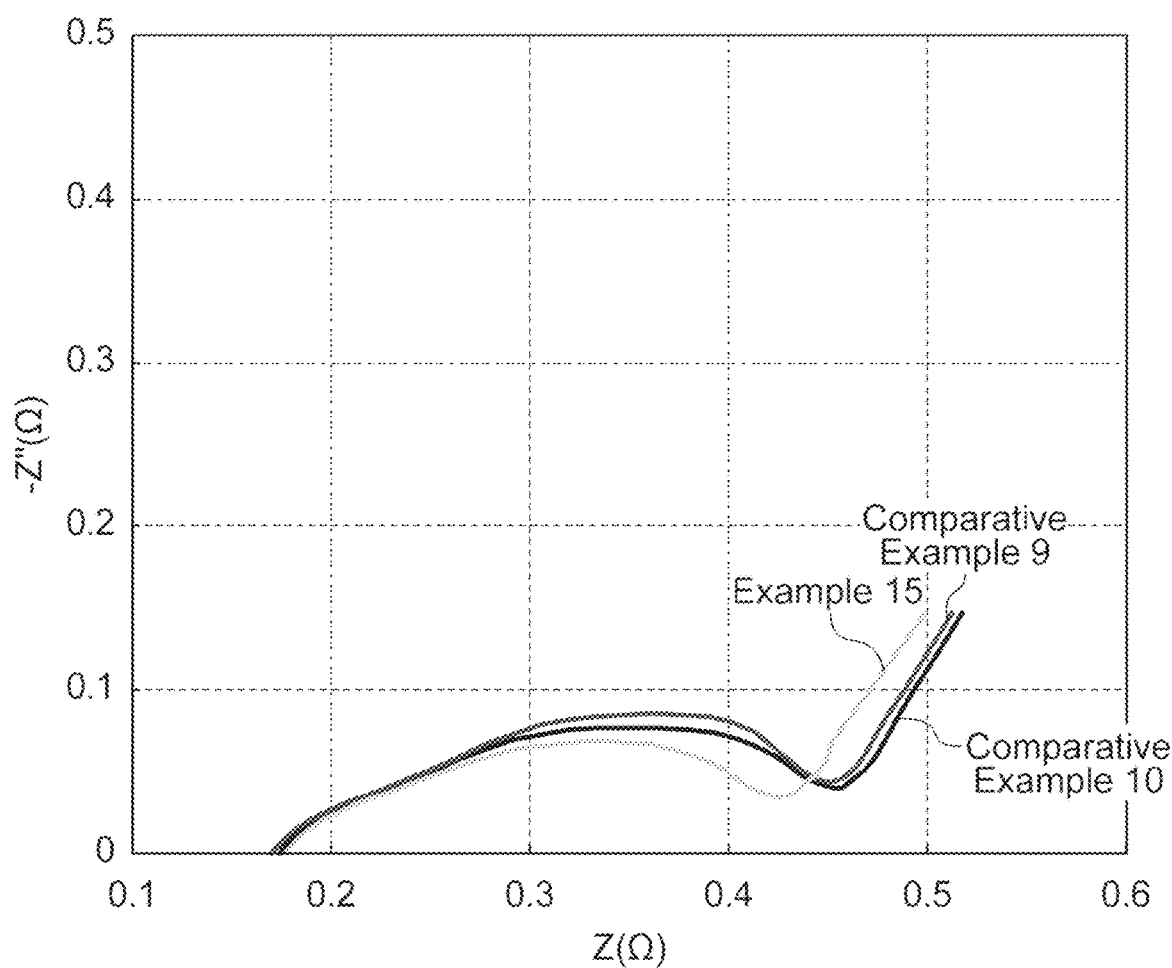
FIG. 14 shows a graph showing measurement results of resistances in Example 15 and Comparative Examples 9 to 10.

For each of the secondary batteries of Example 15 and Comparative Examples 9 to 10, the resistance of each of the secondary batteries was measured by the same method as the method in Examples 5 to 6 and Comparative Example 4 (the method at the time when the upper limit voltage was set at 4.2 V). The measurement results are shown in FIG. 14.

[Measurement of Amount of Volume Change]

Figure 15:
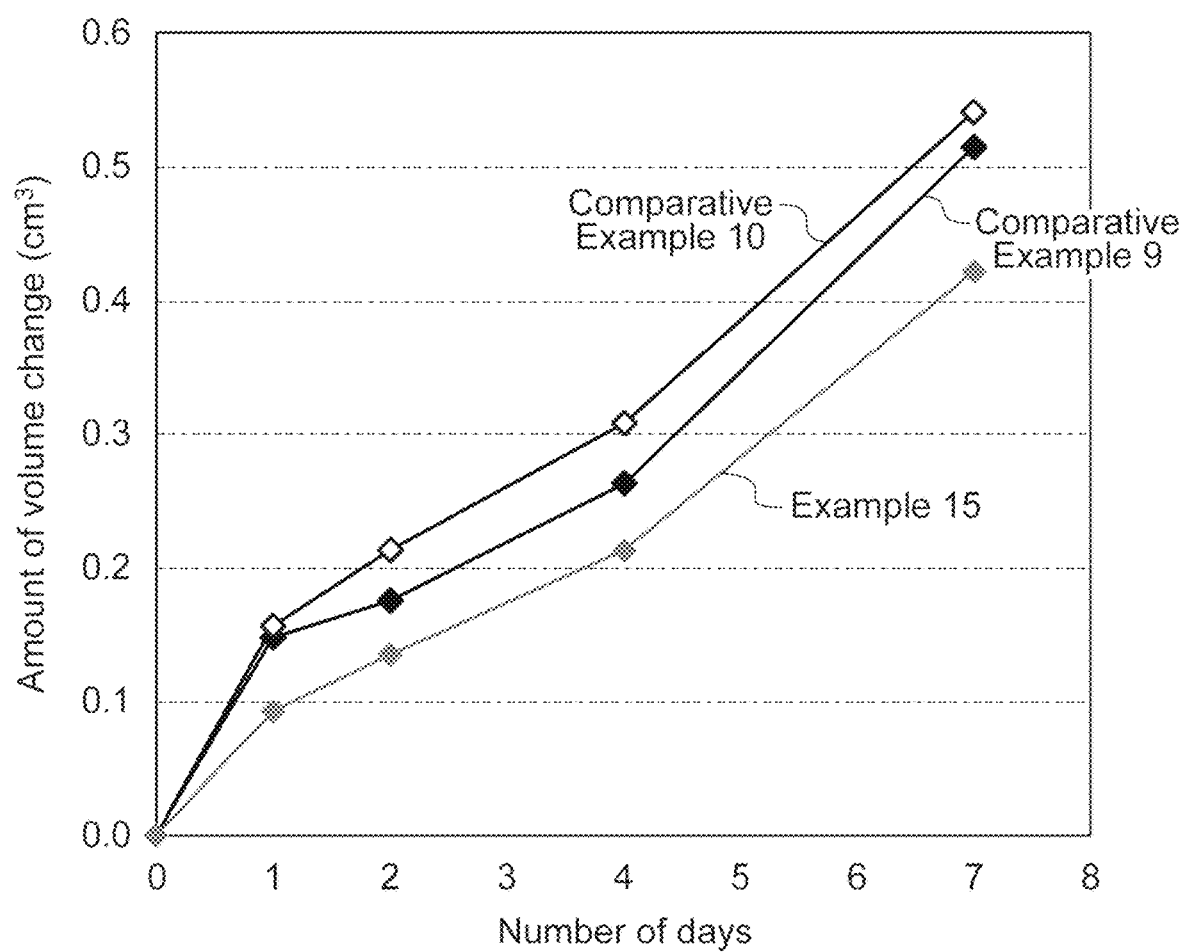
FIG. 15 shows a graph showing measurement results of amounts of volume changes in Example 15 and Comparative Examples 9 to 10.

Each of the secondary batteries of Example 15 and Comparative Examples 9 to 10 was stored at 80° C. for 7 days. The volumes of the secondary batteries were measured every day with an electronic densimeter based on the Archimedes method (Electronic Densimeter MDS-300, manufactured by Alfa Mirage Co. Ltd.), and the differences from the volumes of the secondary batteries before storage (day 0) were determined, respectively. The results are shown in FIG. 15.

As shown in FIGS. 6 to 11 and 14, even in the case where lithium nickel cobalt manganate, lithium iron phosphate or lithium nickel cobalt aluminate was used as the positive electrode active material, the resistances of the lithium ion secondary batteries of Examples 5 to 13 and 15 were low to which the electrolytic solution containing a predetermined amount of the compound A was applied, as compared with the lithium ion secondary batteries of Comparative Examples 4 to 9 to which the electrolytic solution containing no compound A was applied. This mechanism is not necessarily clear, but the reason is considered to be because similarly to the case where lithium cobaltate was used as the positive electrode active material, the film was formed by the addition of the compound A, which was stable on the positive or negative electrode and of which the ion-conductivity was satisfactory, and because by the interaction between the compound A and the lithium ion, the lithium salt (LIPF$_6$) was stabilized, or activation energy for desolvation of lithium decreased.

REFERENCE SIGNS LIST

1 . . . Non-aqueous electrolytic solution secondary battery (electrochemical device), 6 . . . Positive electrode, 7 . . . Separator, 8 . . . Negative electrode.

The invention claimed is:

1. An electrolytic solution comprising a compound represented by the following formula (1), wherein a content of the compound is 0.0001% by mass or more and 10% by mass or less based on a total amount of the electrolytic solution,

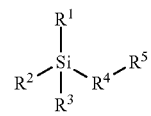
(1)

wherein $R^1$ to $R^3$ each independently represent an alkyl group or a fluorine atom, at least one of $R^1$ to $R^3$ is a fluorine atom, $R^4$ represents an alkylene group, and $R^5$ represents a group represented by the following formula (2):

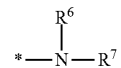
(2)

wherein $R^6$ and $R^7$ each independently represent a hydrogen atom or an alkyl group, and * represents a bond.

2. An electrochemical device comprising:
a positive electrode;
a negative electrode; and
the electrolytic solution according to claim 1.

3. The electrochemical device according to claim 2, wherein the negative electrode comprises a carbon material.

4. The electrochemical device according to claim 3, wherein the carbon material comprises graphite.

5. The electrochemical device according to claim 3, wherein the negative electrode further comprises a material comprising at least one element of the group consisting of silicon and tin.

6. The electrochemical device according to claim 2, wherein the electrochemical device is a non-aqueous electrolytic solution secondary battery or a capacitor.

* * * * *